United States Patent
Aizawa et al.

(10) Patent No.: US 9,840,144 B2
(45) Date of Patent: Dec. 12, 2017

(54) FRONT AIR-RECTIFYING STRUCTURE OF AUTOMOTIVE VEHICLE

(71) Applicant: MAZDA MOTOR CORPORATION, Hiroshima (JP)

(72) Inventors: Makoto Aizawa, Hiroshima (JP); Taiki Yukawa, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 3 days.

(21) Appl. No.: 15/176,432

(22) Filed: Jun. 8, 2016

(65) Prior Publication Data
US 2017/0050509 A1    Feb. 23, 2017

(30) Foreign Application Priority Data

Aug. 19, 2015 (JP) .................... 2015-161572
Aug. 19, 2015 (JP) .................... 2015-161573
Aug. 19, 2015 (JP) .................... 2015-161574

(51) Int. Cl.
| | |
|---|---|
| *B60J 7/00* | (2006.01) |
| *B60K 11/08* | (2006.01) |
| *B60R 19/52* | (2006.01) |
| *B60R 19/02* | (2006.01) |

(52) U.S. Cl.
CPC ......... *B60K 11/085* (2013.01); *B60R 19/023* (2013.01); *B60R 19/52* (2013.01); *B60R 2019/525* (2013.01)

(58) Field of Classification Search
CPC ........ G03B 19/12; G03B 19/18; G03B 17/38; G03B 17/18; B29C 66/71; B29C 65/00; G11B 23/0308; C04B 35/583; C23C 14/243; C23C 16/01

USPC ........................................................ 296/193.1
See application file for complete search history.

(56) References Cited

U.S. PATENT DOCUMENTS

| | | | | |
|---|---|---|---|---|
| 7,866,737 B2 * | 1/2011 | Browne | .............. | F24F 13/1426 296/193.1 |
| 8,281,754 B2 * | 10/2012 | Saida | .................. | B60K 11/085 123/41.04 |
| 8,292,014 B2 * | 10/2012 | Sugiyama | ............ | B60K 11/085 123/41.06 |
| 8,443,921 B2 * | 5/2013 | Charnesky | ................ | F01P 7/10 180/68.1 |
| 8,473,164 B2 * | 6/2013 | Charnesky | ........... | B60K 11/085 123/41.04 |

(Continued)

FOREIGN PATENT DOCUMENTS

| | | |
|---|---|---|
| EP | 2335963 A1 | 6/2011 |
| JP | 2004-299522 A | 10/2004 |
| JP | 2010-163075 A | 7/2010 |

*Primary Examiner* — Kiran B Patel
(74) *Attorney, Agent, or Firm* — Studebaker & Brackett PC

(57) ABSTRACT

A shutter unit comprises plural flaps, a shutter frame member, and a second support portion to support an air guide member. The air guide member comprises a lower face portion positioned between an upper grille opening portion and the flaps, a first fixation portion fixed to a first support portion of a shroud member, and a second fixation portion fixed to a second support portion of the shutter unit. The lower face portion is configured such that the lower face portion in a state in which the second fixation portion is fixed to the second support portion is spaced apart upward from the shutter frame member.

16 Claims, 11 Drawing Sheets

(56) References Cited

U.S. PATENT DOCUMENTS

| | | | | |
|---|---|---|---|---|
| 8,517,130 B2* | 8/2013 | Sakai | B60K 11/085 | 180/68.1 |
| 8,561,738 B2* | 10/2013 | Charnesky | B60K 11/085 | 180/68.1 |
| 8,645,028 B2* | 2/2014 | Mochizuki | B60K 11/085 | 123/41.05 |
| 8,936,121 B2* | 1/2015 | Vacca | B60K 11/04 | 165/44 |
| 8,983,735 B2* | 3/2015 | Konishi | B60K 11/085 | 123/41.04 |
| 2009/0261601 A1* | 10/2009 | Shin | B62D 25/084 | 293/115 |
| 2010/0243352 A1* | 9/2010 | Watanabe | B60K 11/085 | 180/68.1 |
| 2011/0001325 A1* | 1/2011 | Bernt | B60K 11/085 | 293/155 |
| 2011/0061405 A1* | 3/2011 | Watanabe | B60K 11/085 | 62/61 |
| 2011/0097984 A1* | 4/2011 | Hasegawa | B60K 11/085 | 454/152 |
| 2011/0181062 A1* | 7/2011 | Bernt | B60K 11/085 | 293/102 |
| 2011/0203861 A1* | 8/2011 | Charnesky | B60K 11/085 | 180/68.1 |
| 2011/0226541 A1* | 9/2011 | Hori | B60K 11/085 | 180/68.1 |
| 2011/0297468 A1* | 12/2011 | Coel | B60K 11/085 | 180/68.1 |
| 2012/0019025 A1* | 1/2012 | Evans | B60K 11/085 | 296/193.1 |
| 2012/0060776 A1* | 3/2012 | Charnesky | B60K 11/085 | 123/41.05 |
| 2012/0074729 A1* | 3/2012 | Fenchak | B60K 11/085 | 296/193.1 |
| 2012/0090906 A1* | 4/2012 | Charnesky | B60K 11/085 | 180/68.1 |
| 2012/0182138 A1* | 7/2012 | Nakayama | B60Q 5/008 | 340/425.5 |
| 2012/0270490 A1* | 10/2012 | Turner | F01P 7/12 | 454/75 |
| 2012/0305818 A1* | 12/2012 | Charnesky | B60K 11/085 | 251/212 |
| 2012/0312611 A1* | 12/2012 | Van Buren | B60K 11/085 | 180/68.1 |
| 2013/0025952 A1* | 1/2013 | Kitashiba | B60K 11/085 | 180/68.1 |
| 2013/0036991 A1* | 2/2013 | Kerns | F01P 7/10 | 123/41.04 |
| 2013/0075172 A1* | 3/2013 | Hori | B60K 11/085 | 180/68.1 |
| 2013/0092462 A1* | 4/2013 | Chinta | B60K 11/08 | 180/68.1 |
| 2013/0092463 A1* | 4/2013 | Hori | B60K 11/085 | 180/68.1 |
| 2013/0095740 A1* | 4/2013 | Hori | B60K 11/085 | 454/152 |
| 2013/0103265 A1* | 4/2013 | Remy | B60K 11/085 | 701/49 |
| 2013/0126253 A1* | 5/2013 | Saito | B60K 11/085 | 180/68.1 |
| 2013/0184943 A1* | 7/2013 | Sato | B60H 1/00978 | 701/49 |
| 2013/0223980 A1* | 8/2013 | Pastrick | F01D 5/00 | 415/1 |
| 2013/0247862 A1* | 9/2013 | Sakai | B60K 11/085 | 123/188.1 |
| 2013/0248266 A1* | 9/2013 | Asano | B60K 11/04 | 180/68.1 |
| 2013/0252531 A1* | 9/2013 | Asano | B60K 11/085 | 454/155 |
| 2013/0268164 A1* | 10/2013 | Sugiyama | B60K 11/085 | 701/49 |
| 2013/0275009 A1* | 10/2013 | Sakai | B60K 11/085 | 701/49 |
| 2014/0299077 A1* | 10/2014 | Sowards | F01P 7/10 | 123/41.05 |

* cited by examiner

FRONT AIR-RECTIFYING STRUCTURE OF AUTOMOTIVE VEHICLE

BACKGROUND OF THE INVENTION

The present invention relates to a front air-rectifying structure of an automotive vehicle which comprises a shutter unit to control a flow of outside air which flows into an engine room through a grille opening portion formed at a vehicle front portion, for example.

The front portion of the automotive vehicle is configured to take in the outside air into the engine room through the grille opening portion formed at a bumper face, thereby cooling a heat exchanger, such as a radiator or intercooler, as well as an engine. Further, in these days, the automotive vehicle which is provided with the shutter unit to control the flow of the outside air flowing in through the grille opening portion for achieving further improvement of the fuel economy or reduction of exhaust gas is known.

The shutter unit comprises plural flaps which are opened or closed in accordance with a temperature of lubricant oil or cooling water which circulates in the engine, or a vehicle speed. For example, the shutter unit can stop a supply of the outside air to the heat exchanger or the engine by closing the flaps. Thereby, the lubricant oil or cooling water can be heated up to a desired temperature quickly, thereby suppressing deterioration of the fuel economy which may be caused by a so-called warming-up operation.

In the meantime, the shutter unit can suppress the flow of the outside air into the engine room by controlling the flaps according to the vehicle speed, thereby suppressing generation of turbulence which may be caused by merging of the outside air flowing down rearward from the engine room with traveling air flowing down along a vehicle side portion. Thereby, an increase of traveling resistance which may be caused by the turbulence is suppressed, thereby achieving the improvement of the fuel economy or the reduction of exhaust gas.

European Patent Application Publication No. 2335963 A1 discloses, as an example of the above-descried shutter unit, an airflow device 11 which comprises a shutter mechanism including plural openable flaps (fins 17), an air guide member (a duct 22) to guide outside air flowing in through a grille opening portion (a grille 21), and a drive mechanism portion (a link mechanism 24 and a torque motor 26) to drive the flaps for opening or closing, for example.

Meanwhile, the shutter unit of the above-described patent document is configured to have a rather long length in a vehicle width direction from requirements of a vehicle-body design or structure, so that the length, in the vehicle width direction, of the air guide member may become rather long as well.

Further, there may be a situation in which a vehicle-body vibration due to unevenness of a road surface or pressure fluctuation of the outside air flowing in through the grille opening portion acts on the air guide member. Accordingly, the rigidity of a lower portion or an upper portion of the air guide member becomes low easily, so that the lower or upper portions of the air guide member may be made to vibrate greatly by the vehicle-body vibration or the pressure fluctuation.

When the vibration of the air guide member is transmitted to the shutter unit, an unintentional load may be added to a flap support portion supporting the flaps or an opening/closing mechanism portion. Accordingly, there is a concern that a position shift of the flaps or an improper move of the opening/closing mechanism portion may occur, so that some problem may happen to the opening/closing move of the flaps.

SUMMARY OF THE INVENTION

The present invention has been devised in view of the above-described matter, and an object of the present invention is to provide a front air-rectifying structure of an automotive vehicle which can properly suppress the vibration transmission to the shutter unit, without damaging the air-guide performance for the shutter unit, thereby preventing any problem from happening to the move of the flaps.

The present invention is a front air-rectifying structure of an automotive vehicle, comprising a grille opening portion formed at a bumper face which is provided at a vehicle front portion of the automotive vehicle, a shutter unit attached to a vehicle-body member which is positioned in back of the bumper face, and an air guide member provided to guide air flowing in through the grille opening portion toward to the shutter unit, wherein the shutter unit comprises openable flaps, a shutter frame portion having a roughly rectangular shape in a front view and provided to enclose the flaps, and a first support portion to support the air guide member which is formed in the vicinity of a corner portion of the shutter frame portion, the air guide member comprises an air guide portion positioned between the grille opening portion and the flaps of the shutter unit, a first fixation portion fixed to the first support portion of the shutter unit, and a second fixation portion fixed to a second support portion which is provided at the vehicle-body member, and the air guide member is configured such that the air guide portion thereof in a state in which the first fixation portion of the air guide member is fixed to the first support portion of the shutter unit is spaced apart, upward or downward, from the shutter frame portion of the shutter unit.

The above-described vehicle-body member can be a shroud member to support a heat exchanger, such as a radiator, or a member to support the shroud member, for example. The above-described shutter unit can be configured such that the flat plate-shaped flaps are arranged in parallel in a vehicle vertical direction or in a vehicle width direction. Further, the shutter unit can be arranged at a position which is located between the bumper face and the vehicle-body member and above or below a bumper reinforcement which extends in the vehicle width direction. The above-described air guide member can be made from synthetic resin or metal. Further, the air guide member can be configured such that its upper side opens in a U shape in a front view, its lower side opens in the U shape in the front view, or it has a roughly rectangular shape in the front view. The above-described vicinity of the corner portion of the shutter frame portion can be the vicinity of a connection point of a bottom plate portion and a side wall portion of the shutter frame portion, which is positioned outside or inside of the shutter frame portion. The air guide portion and shutter frame portion can be configured to overlap with each other in the vehicle vertical direction or not to overlap with each other in the vehicle vertical direction. A distance of the above-described air guide portion being spaced apart from the shutter frame portion can be large enough not to make the air guide portion vibrating due to the pressure fluctuation or the like contact the shutter frame portion and not to block the air guide from the grille opening portion to the flaps in a case in which the air guide portion and the shutter frame portion are configured to overlap with each other in the vehicle vertical direction.

The present invention can properly suppress the vibration transmission to the shutter unit, without damaging the air-guide performance for the shutter unit, thereby preventing any problem from happening to the move of the flaps. Specifically, the rigidity of the vicinity of the corner portion of the shutter frame portion becomes higher, compared with the bottom plate portion or a central portion, in the vehicle vertical direction, of the side wall portion of the shutter frame portion. Accordingly, the front air-rectifying structure of the automotive vehicle can be configured to improve the support rigidity of the first support portion, compared with a case in which the first support portion is provided at the side wall portion of the shutter frame portion, for example. Thereby, in a case in which the air guide portion is made to vibrate by the pressure fluctuation of the outside air flowing in through the grille opening portion, for example, the first support portion of the shutter frame portion can damp the vibration inputted via the first fixation portion of the air guide member and transmit it to the shutter frame portion. Further, the first support portion can be a positioning means for determining the position of the air guide portion relative to the shutter frame portion. Specifically, in a case in which the first support portion is provided at the vehicle-body member, for example, there is a problem that a relative position of the air guide portion to the shutter frame portion is not stable because of a position shift of the shutter unit relative to the vehicle-body member or a position shift of the air guide member relative to the vehicle-body member.

Meanwhile, the front air-rectifying structure of the automotive vehicle of the present invention can suppress the position shift of the air guide portion relative to the shutter frame portion because the first support portion is provided at the shutter unit more properly, compared with the case in which the first support portion is provided at the vehicle-body member. Accordingly, the front air-rectifying structure of the automotive vehicle of the present invention can stably ensure the distance between the shutter frame portion and the air guide portion when the first fixation portion of the air guide member is fixed to the first support member of the shutter unit. That is, the first support portion can be made to serve as the positioning means for determining the position of the air guide portion relative to the shutter frame portion.

Thus, the front air-rectifying structure of the automotive vehicle of the present invention can make the air guide portion contact the shutter frame portion when the air guide portion vibrates due to the pressure fluctuation of the outside air flowing in through the grille opening portion, for example, thereby suppressing the transmission of the vibration of the air guide portion to the shutter unit. Therefore, the front air-rectifying structure of the automotive vehicle of the present invention in which the air guide member is fixed to the first support portion of the shutter unit having the high support rigidity can properly suppress the vibration transmission to the shutter unit, without damaging the air-guide performance to the shutter unit, thereby preventing any problem from happening to the move of the flaps.

In an embodiment of the present invention, the first support portion of the shutter unit is configured to have a roughly boxy shape extending in a vehicle longitudinal direction. Herein, the roughly boxy shape can be formed by a flat plate portion which extends from the shutter frame portion and has a roughly rectangular shape in the front view, side face portions which extend rearward from at least two sides of the flat plate portion, and the shutter frame, for example.

According to the front air-rectifying structure of the automotive vehicle of the present embodiment, since the support rigidity of the first support portion is improved, the vibration transmitted to the shutter frame portion via the first fixation portion of the air guide member can be further suppressed. Therefore, the vibration transmission to the shutter unit can be surely suppressed by the first support portion formed in the roughly boxy shape.

In another embodiment of the present invention, the shutter unit is positioned in front of the vehicle-body member and above a bumper reinforcement which extends in a vehicle width direction, a stay member which connects an upper portion of the vehicle-body member and the bumper reinforcement is provided, and the air guide portion of the air guide member comprises a lower face portion which is positioned between the grille opening portion and the flaps of the shutter unit and has the first fixation portion at a position in the vicinity of each of both ends, in the vehicle width direction, thereof, and a pair of right-and-left side face portions which are configured to stand upward from the both ends, in the vehicle width direction, of the lower face portion and have the second fixation portion at each of upper sides thereof, and a third fixation portion which is fixed to the stay member is provided at a portion of the lower face portion of the air guide portion of the air guide member which is positioned between both of the first fixation portions.

The above-described stay member can be a single stay member which is provided at a central portion in the vehicle width direction, or plural members which are provided at specified intervals in the vehicle width direction, for example. In a case in which plural stay members are provided, the above-described third fixation portion can be plural portions which are fixed to all of the plural stay members or part of the plural stay members.

The front air-rectifying structure of the automotive vehicle of the present embodiment can surely prevent the problem from happening to the move of the flaps and surely suppress the vibration transmission to the shutter unit. Specifically, in a case in which an intercooler of a supercharger of the automotive vehicle is arranged below the bumper reinforcement, for example, there is a need for positioning the shutter unit above the bumper reinforcement in order to supply the outside air to the intercooler. In this case, the air guide member can be supported by the first support portion of the shutter unit, the second support portion of the vehicle-body member, and the stay member by fixing the air guide member to the stay member. Accordingly, the air guide member can be supported at plural points by the vehicle-body member having a higher rigidity than the shutter unit. Therefore, the weight of the air guide member added to the first support portion of the shutter unit can be reduced.

Further, in a case in which the air guide portion is made to vibrate by the pressure fluctuation of the outside air flowing in through the grille opening portion, for example, the stay member can transmit the vibration inputted by way of the third fixation portion to the vehicle-body member. Thereby, the vibration of the air guide portion can be dispersed to the vehicle-body member by way of the second fixation portion and the third fixation portion. Thereby, deformation of the shutter frame portion can be suppressed by the weight of the air guide member added to the first support portion. Further, the vibration transmitted to the shutter unit by way of the first fixation portion of the air guide member can be surely suppressed. Accordingly, the front air-rectifying structure of the automotive vehicle of the present embodiment can surely prevent any problem from happening to the move of the flaps and surely suppress the vibration transmission to the shutter unit by providing the third fixation portion fixed to the stay member at the lower face portion of the air guide member.

In another embodiment of the present invention, a bottom plate portion of the shutter frame portion of the shutter unit is configured such that a front end thereof is positioned in back of a front end of the bumper reinforcement, the lower face portion of the air guide portion of the air guide member in the state in which the first fixation portion of the air guide member is fixed to the first support portion of the shutter unit is spaced apart upward from the bottom plate portion of the shutter frame portion of the shutter unit, and a length, in the vehicle longitudinal direction, of the lower face portion of the air guide portion is configured such that a front end of the lower face portion is positioned in the vicinity of the front end of the bumper reinforcement and a rear end of the lower face portion is positioned in back of a front end of the bottom plate portion of the shutter frame portion of the shutter unit.

The front air-rectifying structure of the automotive vehicle of the present embodiment can stably ensure the air-guide performance to the shutter unit and also suppress breakage of the shutter unit in a light collision of the vehicle front portion. Specifically, since the length, in the vehicle longitudinal direction, of the lower face portion of the air guide portion is configured such that the front end is positioned in the vicinity of the front end of the bumper reinforcement and the rear end is positioned in back of the front end of the bottom plate portion of the shutter frame portion, the lower face portion can overlap upward with the bottom plate portion of the shutter frame portion. Thus, compared with a case in which the lower face portion overlaps downward with the bottom plate portion of the shutter frame portion, the air guide member can surely guide the outside air flowing in through the grille opening portion to the flaps. Accordingly, the front air-rectifying structure of the automotive vehicle of the present embodiment can stably ensure the air-guide performance for the shutter unit. Further, in a case of the light collision in which a retreat amount of the bumper reinforcement is small, since the front end of the bottom plate portion of the shutter frame portion is positioned in back of the front end of the bumper reinforcement, it can be prevented that the shutter unit is pressed rearward by an object colliding with the vehicle front portion.

In addition, since the retreat of the air guide member by the pressing of the collision object can be suppressed by the stay member, the lower face portion of the air guide member having a low rigidity deforms or gets broken in a case in which the collision object presses the air guide member. Accordingly, the front air-rectifying structure of the automotive vehicle of the present embodiment can suppress the pressing of the shutter unit even in a case in which the collision object presses the air guide member. Thus, in the case of the light collision, the retreat of the air guide member can be suppressed and also the breakage of the shutter unit can be suppressed. Accordingly, the front air-rectifying structure of the automotive vehicle of the present embodiment can stably ensure the air-guide performance for the shutter unit and suppress the breakage of the shutter unit in the light collision to the vehicle front portion.

Further, in another embodiment of the present invention, the air guide member is made from synthetic resin. According to the present embodiment, the present front air-rectifying structure of the automotive vehicle can be provided with the air guide member having a lower cost and higher rigidity, compared with a case in which the air guide member is made of a synthetic rubber or a thin metal plate.

Thus, in a case in which the pressure fluctuation happens to the outside air flowing in through the grille opening portion, for example, the air guide member can prevent the vibration from occurring at the air guide portion, thereby suppressing the vibration transmission to the shutter unit. Accordingly, the front air-rectifying structure of the automotive vehicle of the present embodiment can surely suppress the vibration transmission to the shutter unit, without damaging the air-guide performance for the shutter unit.

Also, in another embodiment of the present invention, the shutter unit is arranged above a bumper reinforcement of the vehicle front portion, the grille opening portion is configured to face the shutter unit, a drive mechanism portion to drive the flaps for opening or closing is provided at an outer peripheral face of the shutter frame portion, and the air guide member is configured in a shape to integrally enclose the shutter frame portion and the drive mechanism portion.

The above-described drive mechanism portion can comprise a link mechanism coupled to the flaps, gears, a drive motor to drive the link mechanism and the gears, and others, and can be arranged at a side face, an upper face, or a lower face of the shutter frame portion.

According to this embodiment, the flow of the outside air flowing through the shutter unit is not blocked, so that it can be prevented that the drive mechanism portion has a problem which may be caused by hot air circulating around the vehicle front portion. Specifically, since the drive mechanism portion is provided at the outer peripheral face of the shutter frame portion, the shutter unit can ensure an appropriate and required opening area of the shutter frame portion in a state of the flaps being open, compared with a case in which the drive mechanism portion is provided inside the shutter frame portion. Further, since the air guide member is configured in the shape to integrally enclose the shutter frame portion and the drive mechanism portion, the air guide member can guide the outside air flowing in through the grille opening portion to the drive mechanism portion. Accordingly, the front air-rectifying structure of the automotive vehicle of the present embodiment can always cool the drive mechanism portion arranged at the outer peripheral face of the shutter frame portion regardless of the opening/closing state of the flaps.

Moreover, the hot air circulating around the vehicle front portion is made to flow upward easily by the outside air flowing in through the grille opening portion. Therefore, in a case in which the air guide member is configured to have the U shape, in a front view, which opens upward, for example, the air guide member can prevent the hot air circulating around the vehicle front portion from flowing into the inside of the air guide member from its outside. Thus, according to the front air-rectifying structure of the automotive vehicle of the present embodiment, even in a case in which the air guide member is configured to have the U shape, in the front view, which opens upward, it can be prevented that the drive mechanism portion is exposed to the hot air circulating around the vehicle front portion. Accordingly, in the front air-rectifying structure of the automotive vehicle of the present embodiment, the flow of the outside air flowing through the shutter unit is not blocked by the air guide member configured to integrally enclose the drive mechanism portion provided at the outer peripheral face of the shutter frame portion, so that it can be prevented that the drive mechanism portion has the problem which may be caused by the hot air circulating around the vehicle front portion.

In another embodiment of the present invention, the shutter unit is configured to face the grille opening portion in a longitudinal direction and have a facing area which is covered by an opening area of the grille opening portion.

The front air-rectifying structure of the automotive vehicle of the present embodiment does not block the flow of the outside air flowing through the shutter unit, thereby more stably cooling the drive mechanism portion. Specifically, since the shutter unit faces the grille opening portion, having the facing area covered by the opening area of the grille opening portion, the drive mechanism portion can be configured to surely face the grille opening portion. Further, since the air guide member is configured to integrally enclose the shutter frame portion and the drive mechanism portion, the outside air flowing in through the grille opening portion can be more stably guided to the drive mechanism portion.

In addition, in a case in which the area, in the front view, of the shutter frame portion is smaller than the opening area, in the front view, of the grille opening portion, the shutter unit can prevent a flowing-speed decrease of the outside air flowing through the shutter frame portion. Therefore, the outside air can be surely supplied to the heat exchanger or the like which are arranged in back of the shutter unit, for example. Thus, since the shutter unit faces the grille opening portion, having the facing area covered by the opening area of the grille opening portion, the front air-rectifying structure of the automotive vehicle of the present embodiment can more stably cool the drive mechanism portion, without blocking the flow of the outside air flowing through the shutter unit.

In another embodiment of the present invention, the drive mechanism portion is provided at a side portion or a lower portion of the shutter frame portion, and the air guide member is configured to be arranged close to the bumper reinforcement in a vehicle vertical direction and have a roughly U shape, in a front view, which opens upward.

The front air-rectifying structure of the automotive vehicle of the present embodiment can supply the outside air to a rearward side relative to the shutter unit even in a state in which the flaps are closed, thereby suppressing occurrence of heat damage inside the engine room, for example. Specifically, in a case in which the air guide member is configured in a roughly tubal shape to connect the grille opening portion and the shutter unit, for example, if the flaps keep their closed state, no outside air is supplied to the heat exchanger or the engine which are provided in back of the shutter unit. Consequently, the heat exchanger or the like are not cooled and the hot air warmed up by the engine stays around, so that there is a concern that each component inside the engine room may have the heat damage.

Herein, since the air guide member is configured to have the roughly U shape, in the front view, which opens upward, the air guide member can supply the outside air flowing in through the grille opening portion to the rearward side of the vehicle through its upward-opening portion, cooperating with the shutter unit with the closed flaps. Thereby, the front air-rectifying structure of the automotive vehicle of the present embodiment can supply the hot air staying in an upper space behind the shutter unit to the rearward side of the vehicle even if the flaps keep their closed state, thereby suppressing the occurrence of the heat damage inside the engine room.

Further, in a case in which the flaps are closed, it becomes difficult for the outside air flowing in through the grille opening portion to be directly supplied to the heat exchanger or the engine which are disposed behind the shutter unit because of cooperation of the shutter unit and the air guide member, for example. Therefore, even if the air guide member has the roughly U shape, in the front view, which opens upward, the hot air easily staying in the upper face inside the engine room is supplied to the rearward side of the vehicle, for example, so that the temperature of the cooling water or the lubricant oil can be quickly increased to a required one. Accordingly, the front air-rectifying structure of the automotive vehicle of the present embodiment can supply the outside air to the rearward side relative to the shutter unit by the air guide member having the roughly U shape, in the front view, which opens upward even if the flaps keep their closed state, thereby suppressing the occurrence of the heat damage inside the engine room, for example.

In another embodiment of the present invention, an electric device to detect a front side which is located in front of the bumper face is provided at a central position, in a vehicle width direction, of the vehicle, which is located in front of the shutter unit, the drive mechanism portion is arranged at a side portion of the shutter frame portion.

The above-described electric device can be a sensor to identify another vehicle or an obstacle positioned in front, a millimeter-wave radar or a micrometer-wave radar as a sensor to measure a distance from the vehicle or the obstacle, or the like. Alternatively, a camera to capture a front image can be applied.

The front air-rectifying structure of the automotive vehicle of the present embodiment can prevent any problem from happening to the electric device, which may be caused by an electromagnetic noise which is generated by the drive mechanism portion in a case in which the electric device is arranged in front of the shutter unit. Specifically, in a case in which the drive motor is provided at the drive mechanism portion, for example, the drive mechanism portion may generate the electromagnetic noise. Therefore, when the drive mechanism portion gets closer, the electric device is more easily influenced by the electromagnetic noise, so that there is a concern that the electric device may fail to detect the state in front. Thus, since the electric device is provided at the central position, in a vehicle width direction, of the vehicle and the drive mechanism portion is arranged at the side portion of the shutter frame portion, the electric device can be spaced apart from the drive mechanism portion, so that the electric device is not easily influenced by the electromagnetic noise generated by the drive mechanism portion. Accordingly, the front air-rectifying structure of the automotive vehicle of the present embodiment in which the electric device is provided at the central position, in the vehicle width direction, of the vehicle and the drive mechanism portion is arranged at the side portion of the shutter frame portion can prevent any problem from happening to the electric device, which may be caused by the electromagnetic noise generated by the drive mechanism portion.

In another embodiment of the present invention, a heat generating equipment which is required to be cooled is provided above the shutter unit, and the air guide member is provided with a connecting passage which connects to the vicinity of the heat generating equipment, the connecting passage being positioned above the drive mechanism portion of the shutter unit.

The above-described providing of the heat generating equipment above the shutter unit means that the heat generating equipment is located right above the shutter unit or the heat generating equipment is located at a position which is above the shutter unit and also offset from the shutter unit in the vehicle width direction. The above-described heat generating equipment can be a headlight unit comprising a head lamp, a headlight unit comprising a head lamp, a side lamp and others, or the like, for example. The above-described connecting passage can be the one which is formed by partially cutting off an upper portion of the air guide member having the roughly U shape, in the front view, which opens upward, for example. Alternatively, the connecting passage can be the one which is formed by opening part of a side portion or an upper portion of the air guide member having the roughly rectangular shape in the front view.

The front air-rectifying structure of the automotive vehicle of the present embodiment can supply the outside air to the heat generating equipment and prevent that the drive mechanism portion is exposed to the hot air heated by the heat generating equipment. Specifically, the heat generating equipment which generates the heat, such as a LED lamp, may be provided above the shutter unit. The heat generating equipment is required to be compulsorily cooled for protection and stable performance of an installed circuit board or the like.

Herein, in case in which the heat generating equipment is located at the position which is above the shutter unit and also outward-offset from the shutter unit in the vehicle width direction, for example, there is a concern that the outside air flowing in through the grille opening portion may not be supplied to the heat generating equipment properly because of the magnitude of a vertical length of the air guide member. However, since the connecting passage is provided at the air guide member, the air guide member can guide the outside air flowing in through the grille opening portion to the drive mechanism portion and the heat generating equipment. In this case, the air guide member can guide the outside air to the heat generating equipment regardless of the opening/closing state of the flaps, so that the heat generating equipment can be stably cooled.

Further, since the connecting passage is provided above the drive mechanism portion, it can be prevented that the hot air heated by the heat generating equipment flows into the inner space of the air guide member. Accordingly, the front air-rectifying structure of the automotive vehicle of the present embodiment can supply the outside air to the heat generating equipment by means of the connecting passage provided above the drive mechanism portion regardless of the opening/closing state of the flaps, and also prevent that the drive mechanism portion is exposed to the hot air heated by the heat generating equipment.

Moreover, in another embodiment of the present invention, the shutter unit is arranged above a bumper reinforcement of the vehicle front portion, a horn device is provided above the shutter unit, having a specified distance from the shutter unit, the grille opening portion is configured to face the shutter unit, the horn device is configured such that a horn opening portion which is an inlet and an outlet of a horn sound opens downward, and a top plate portion of the shutter frame portion is configured such that a front end thereof is positioned in back of a front end of the horn opening portion.

The above-described top plate portion of the shutter frame portion can be formed in a shape such that its front end is positioned substantially at the same position as front ends of the flaps in the vehicle longitudinal direction, or it can be formed in an eaves shape such that it protrudes forward beyond the front ends of the flaps.

The front air-rectifying structure of the automotive vehicle of the present embodiment can compatibly achieve the appropriate propagation of the horn sound and the flow control of the outside air flowing in through the grille opening portion. Specifically, since the horn device is provided above the shutter unit, the horn device never block the flow of the outside air flowing into the shutter frame portion of the shutter unit. Further, by configuring the top plate portion of the shutter frame portion in the eaves shape such that it protrudes forward, for example, the shutter unit can surely guide the outside air flowing in through the grille opening portion to the flaps. Since the front end of the top plate portion of the shutter frame portion is positioned in back of the front end of the horn opening portion of the horn device, that is—a portion of the horn opening portion and the top plate portion of the shutter frame portion face each other in the vehicle vertical direction, the shutter frame portion can prevent that a sound pressure of the horn sound directly acts on the flaps. Accordingly, the shutter unit can prevent any noise which may be generated by vibrations of the flaps caused by the horn sound or an improper opening/closing state of the flaps which may be caused by transmission of the vibrations of the flaps to the drive mechanism portion to drive the flaps. Thus, the shutter unit can surely control the flow of the outside air flowing downward from the grille opening portion in accordance with the opening/closing state of the flaps.

Further, since the portion of the horn opening portion and the top plate portion of the shutter frame portion face to each other in the vehicle vertical direction, part of the horn sound emitted from the horn device can be reflected by the top plate portion of the shutter frame portion and then propagated forward and upward. And, the horn sound propagated forward and upward can be reflected by a lower face of an engine hood, for example, and then propagated forward and downward.

The front air-rectifying structure of the automotive vehicle of the present embodiment can propagate the horn sound of the horn device downward and upward, suppressing an increase of the number of parts. Thus, the front air-rectifying structure of the automotive vehicle can suppress the directivity of the horn sound and also propagate the horn sound to the outside of the vehicle through an entire part of the grille opening portion.

Herein, the front air-rectifying structure of the automotive vehicle of the present embodiment does not require any electric power consumption for opening the closed flaps nor need to delay emitting the horn sound from the horn device, compared with a case in which the openable flaps are positioned in front of the horn device.

Additionally, since the horn opening portion and the top plate portion of the shutter frame portion face each other in the vehicle vertical direction, each longitudinal length of the horn device and the shutter unit can be shortened properly, compared with a case in which the horn device is arranged in front or back of the shutter unit. Thus, the horn device and the shutter unit can be efficiently arranged in a limited space at the vehicle front portion. Accordingly, the front air-rectifying structure of the automotive vehicle of the present embodiment in which the front end of the top plate portion of the shutter frame portion is positioned in back of the front end of the horn opening portion of the horn device can compatibly achieve the appropriate propagation of the horn sound and the flow control of the outside air flowing in through the grille opening portion.

In another embodiment of the present invention, the grille opening portion, the shutter unit, and the horn device are configured such that the shutter unit and the horn device are positioned in an opening range of the grille opening portion in the front view. According to the present embodiment, an air guide space where the outside air flows rearward can be formed at a position which is located above the shutter unit and around the horn device.

Thereby, even in a state in which the flaps are closed, the outside air flowing in through the grille opening portion can be supplied rearward through this air guide space. In this case, since the flaps are closed, the outside air may not be directly supplied to the heat exchanger or the engine which are disposed behind the shutter unit, for example. Therefore, the front air-rectifying structure of the automotive vehicle of the present embodiment can make the hot air staying in the upper space of the engine room flow rearward properly, increasing the temperature of the cooling water or the lubricant oil to the desired temperature quickly, so that the occurrence of the heat damage inside the engine room can be suppressed, for example.

Further, since the horn sound from the horn device is propagated in the air guide space, the air guide space can be an acoustic space where the horn sound is efficiently reflected. Additionally, in a case in which the grille opening portion is provided to be spaced forward apart from the shutter unit, for example, the air guide space can be expanded forward, so that the present front air-rectifying structure can constitute the larger acoustic space. Thereby, the front air-rectifying structure of the automotive vehicle can suppress the directivity of the horn sound more and propagate the horn sound to the outside of the vehicle through the entire part of the grille opening portion more. Accordingly, the front air-rectifying structure of the automotive vehicle of the present embodiment which creates the air guide space of the outside air flowing around the horn device can compatibly achieve the appropriate propagation of the horn sound and the flow control of the outside air flowing in through the grille opening portion.

In another embodiment of the present invention, an echo portion which faces the horn opening portion of the horn device is provided between a lower portion of the grille opening portion and the flaps, the echo portion being configured to slant forward and downward.

The above-described echo portion can be made from synthetic resin or meal, and may serve as an air guide portion to guide the outside air to the shutter unit through the grille opening portion. Further, the echo portion can be formed separately from a vehicle-body member to support the shutter unit or the like, or integrally formed with this vehicle-body member.

The front air-rectifying structure of the automotive vehicle of the present embodiment can compatibly achieve the appropriate propagation of the horn sound and the flow control of the outside air flowing in through the grille opening portion. Specifically, since the echo portion slants forward and downward, the horn sound propagated forward and downward from the horn opening portion can be reflected forward and upward by the echo portion. Thus, the present front air-rectifying structure can surely propagate the horn sound toward the grille opening portion. Accordingly, the front air-rectifying structure of the automotive vehicle of the present embodiment can more properly suppress the directivity of the horn sound and more surely propagate the horn sound to the outside of the vehicle through the entire part of the grille opening portion by means of the top plate portion and the echo portion of the shutter unit.

Moreover, in a case in which the echo portion is configured to guide the outside air flowing in through the grille opening portion, the present front air-rectifying structure can compatibly achieve the appropriate propagation of the horn sound of the horn device and the appropriate air guide of the outside air flowing in, suppressing the number of components. Accordingly, the front air-rectifying structure of the automotive vehicle of the present embodiment which comprises the echo portion configured to slant forward and downward can compatibly achieve the appropriate propagation of the horn sound and the flow control of the outside air flowing in through the grille opening portion.

Other features, aspects, and advantages of the present invention will become apparent from the following description which refers to the accompanying drawings.

DETAILED DESCRIPTION OF THE INVENTION

Figure 1:
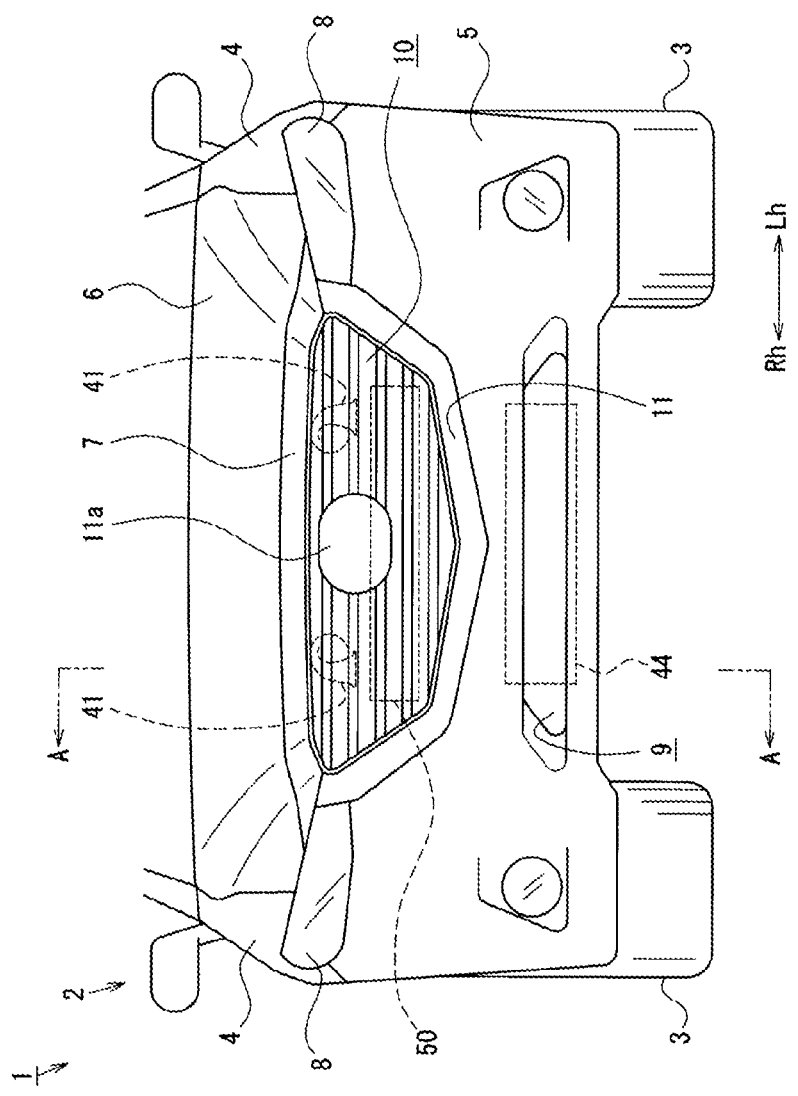
FIG. 1 is a front view of a vehicle front portion of an automotive vehicle.

An embodiment of the present invention will be described referring to the drawings. An automotive vehicle 1 of the present embodiment is a vehicle which installs an engine (not illustrated) having a supercharger with an intercooler at a vehicle front portion 2. The vehicle front portion 2 of the automotive vehicle 1 will be described specifically referring to FIGS. 1 through 8.

Figure 2:
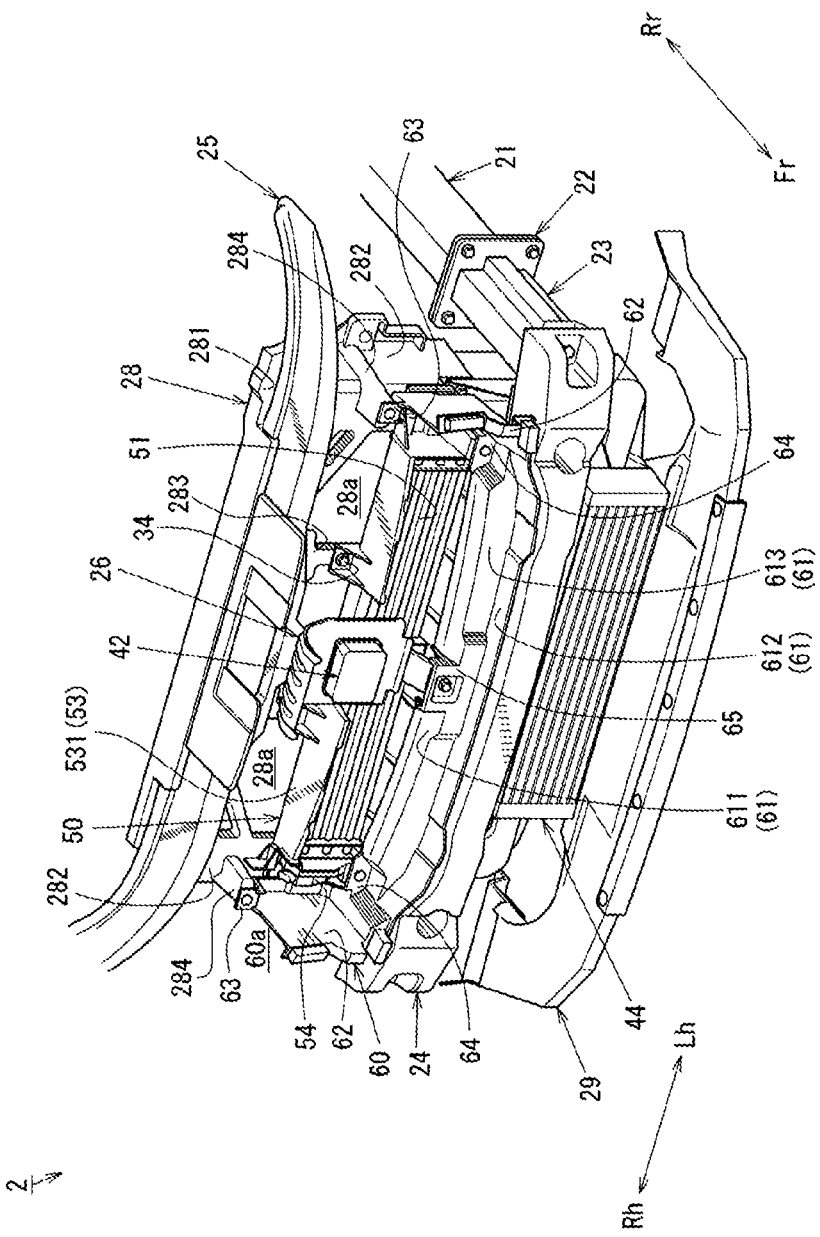
FIG. 2 is a perspective view showing an appearance of an internal structure of the vehicle front portion.
Figure 3:
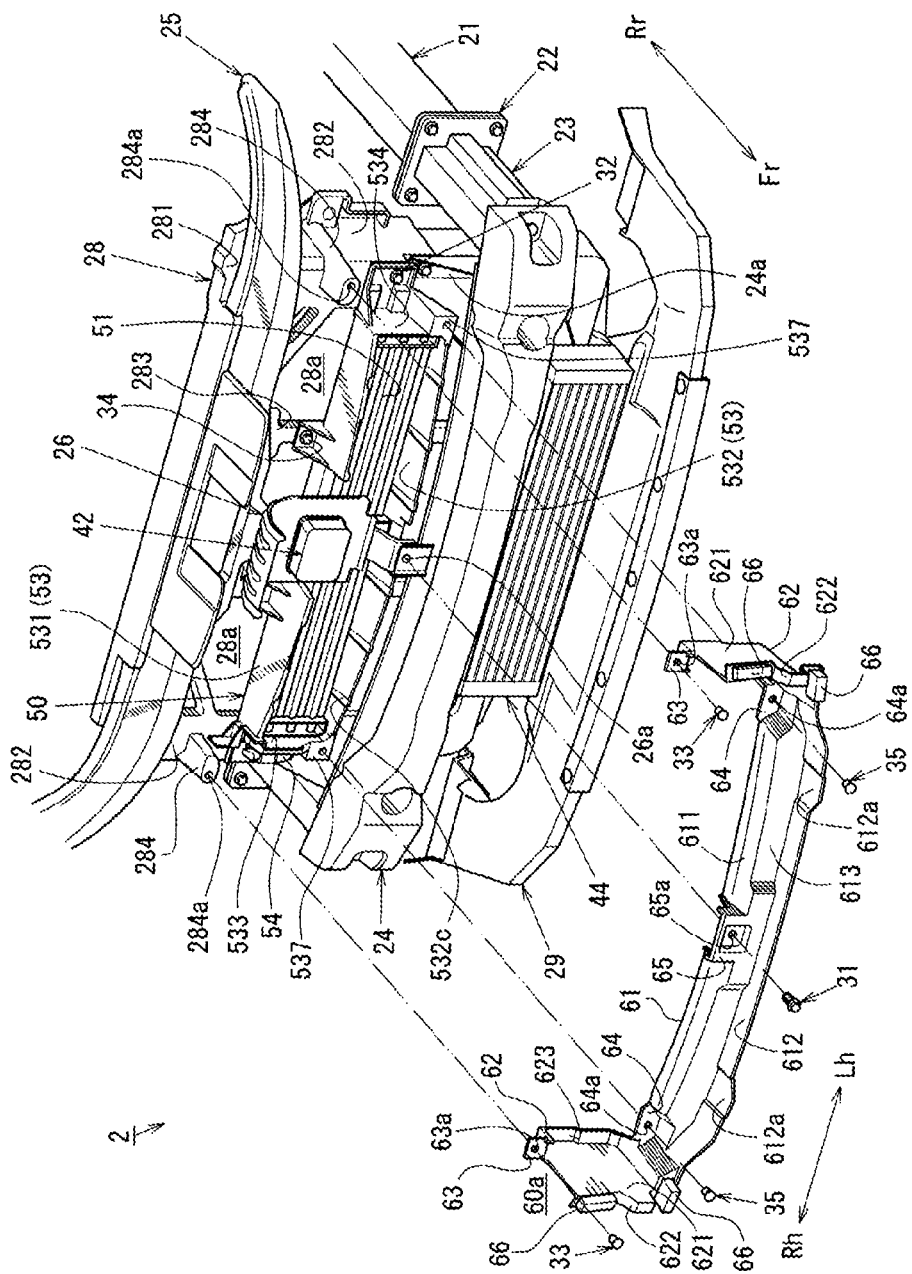
FIG. 3 is an exploded perspective view showing the appearance of the vehicle front portion in a state in which an air guide member is removed.
Figure 4:
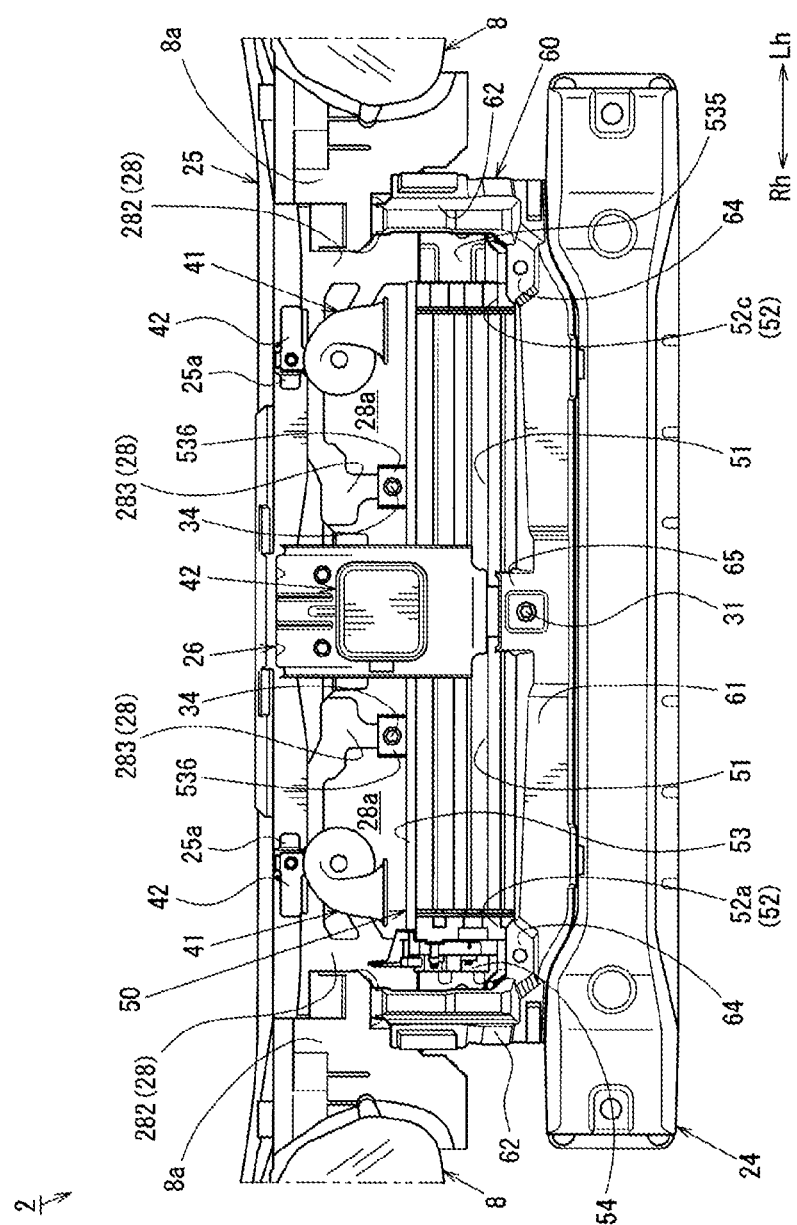
FIG. 4 is a front view showing a major part of the vehicle front portion.
Figure 5:
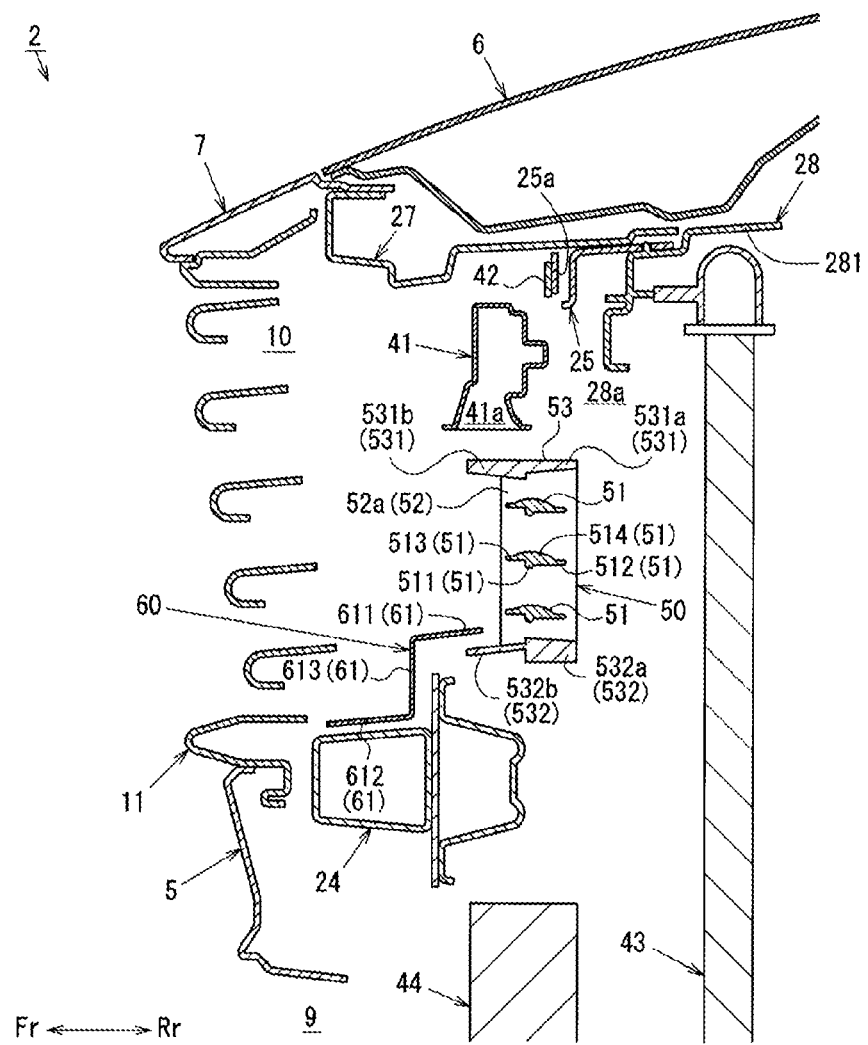
FIG. 5 is a sectional view taken along line A-A of FIG. 1 in a state in which flaps are open.
Figure 6:
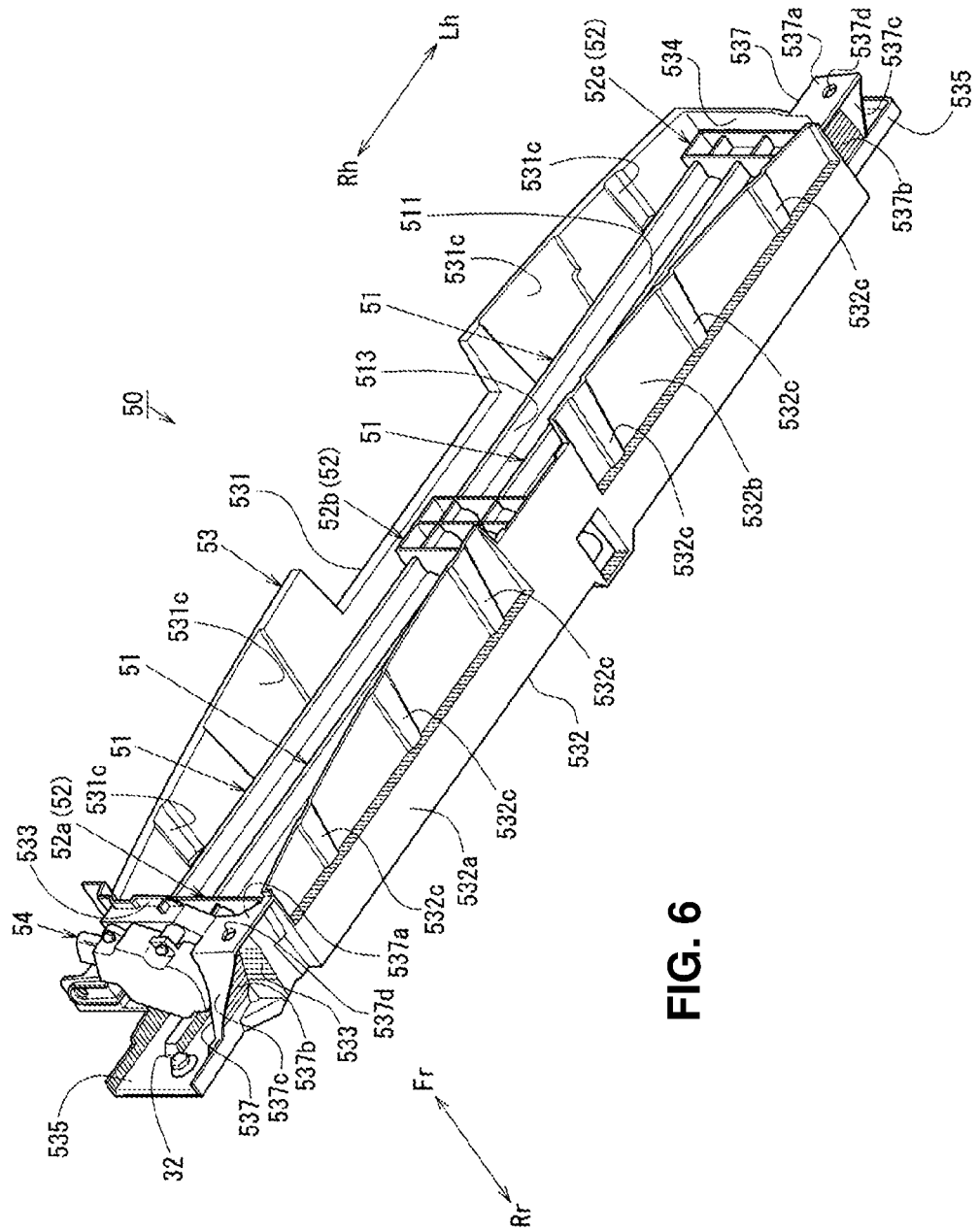
FIG. 6 is a perspective view showing an appearance of a shutter unit, when viewed from a forward and downward side of the vehicle.
Figure 7:
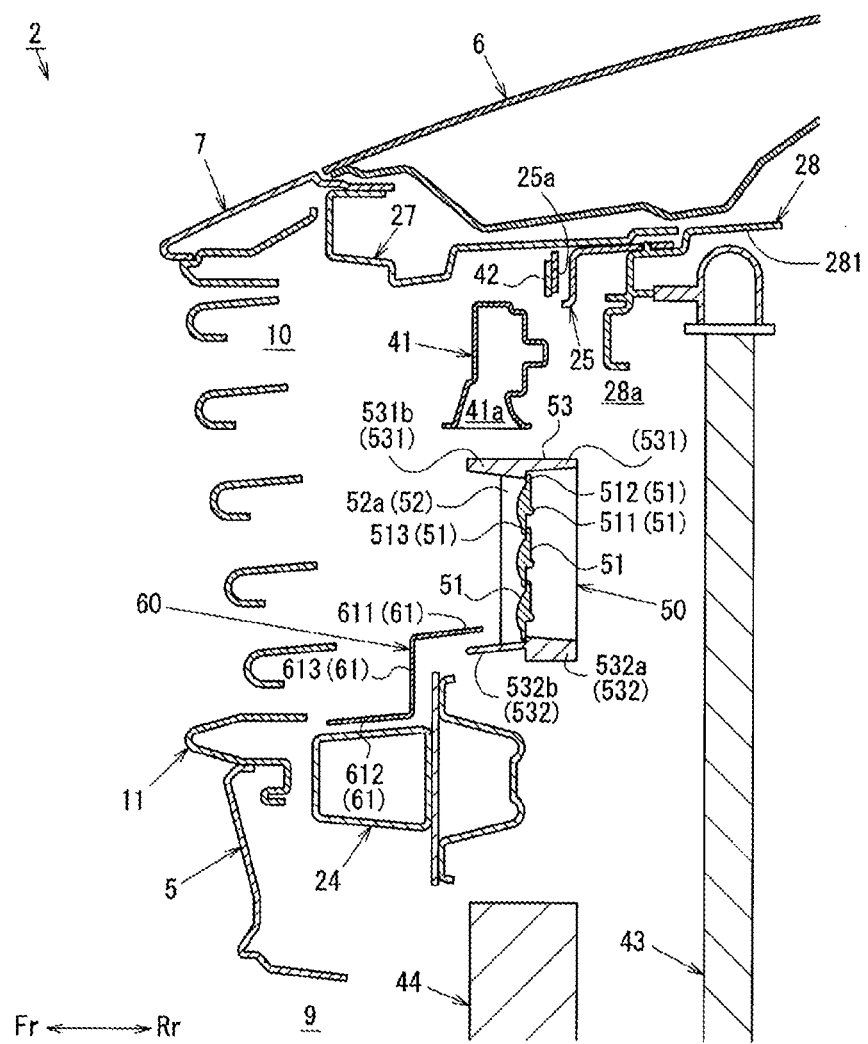
FIG. 7 is a sectional view taken along line A-A of FIG. 1 in a state in which the flaps are closed.
Figure 8:
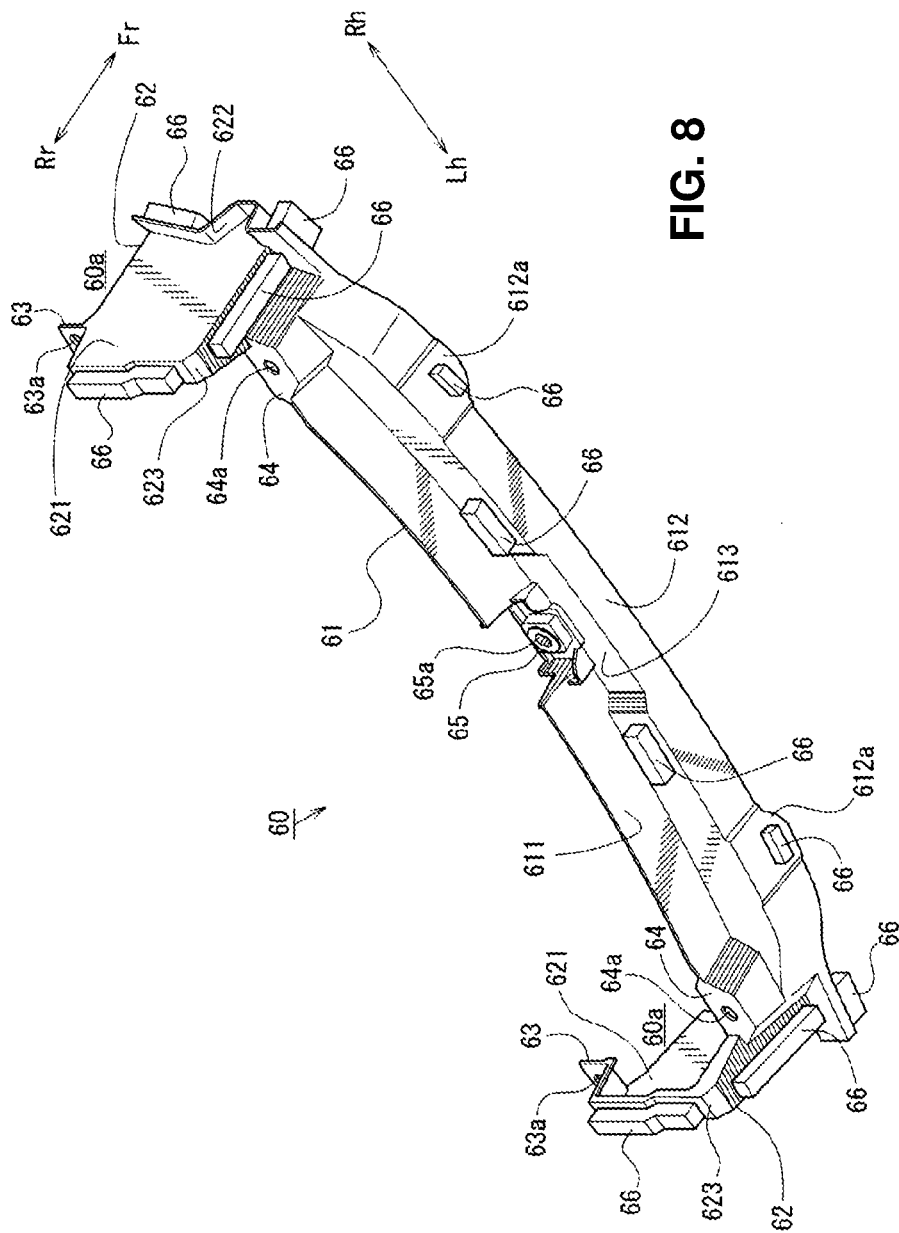
FIG. 8 is a perspective view showing an appearance of an air guide member, when viewed from a rearward and downward side of the vehicle.

Herein, FIG. 1 is a front view of the vehicle front portion 2 of the automotive vehicle 1, FIG. 2 is a perspective view showing an appearance of an internal structure of the vehicle front portion 2, FIG. 3 is an exploded perspective view showing the appearance of the vehicle front portion 2 in a state in which an air guide member 60 is removed, FIG. 4 is a front view showing a major part of the vehicle front portion 2, FIG. 5 is a sectional view taken along line A-A of FIG. 1 in a state in which flaps 51 are open, FIG. 6 is a perspective view showing an appearance of a shutter unit 50, when viewed from a forward and downward side of the vehicle, FIG. 7 is a sectional view taken along line A-A of FIG. 1 in a state in which the flaps 51 are closed, and FIG. 8 is a perspective view showing an appearance of an air guide member 60, when viewed from a rearward and downward side of the vehicle.

Illustration of a horn 41 is omitted in FIGS. 2 and 3 and illustration of a lower portion of the vehicle front portion 2 is omitted in FIGS. 5 and 7 for clarifying the illustration of the major part. In the figures, arrows Fr, Rr show a vehicle longitudinal direction, the arrow Fr showing a vehicle forward side and the arrow Rr showing a vehicle rearward side. Further, arrows Rh, Lh show a vehicle width direction, the arrow Rh showing a vehicle rightward side and the arrow Lh showing a vehicle leftward side. Additionally, an upper side in the figures corresponds to a vehicle upper side, and a lower side in the figures corresponds to a vehicle lower side.

The vehicle front portion 2 of the automotive vehicle 1 comprises, as shown in FIG. 1, a pair of right-and-left front fenders 4 which are arranged above front wheels 3, a bumper face 5 which is provided to cover an opening portion provided in front of the front fenders 4, an engine hood (bonnet) 6 which openably covers an opening at a vehicle upper side, and an engine-hood garnish 7 which closes a gap between the bumper face 5 and a front end of the engine hood 6.

Further, a pair of right-and-left head light units 8, each of which is enclosed by the front fender 4, the bumper face 5, and the engine hood 6, are provided at both ends, in a vehicle width direction, of the vehicle front portion 2. A lower grille opening portion 9 and an upper grille opening portion 10, which serve as an intake port though which the outside air is introduced into the inside of the vehicle front portion 2, are formed at a central portion, in the vehicle width direction, of the bumper face 5.

The lower grille opening portion 9 is, as shown in FIG. 1, formed in a roughly rectangular shape having a longer side in the vehicle width direction at a lower portion of the bumper face 5. This lower grille opening portion 9 is configured to face an intercooler 44 which is arranged inside the vehicle front portion 2. The intercooler 44 will be described specifically later.

The upper grille opening portion 10 is, as shown in FIG. 1, formed in a roughly inverse-pentagonal shape which is enclosed by a front grille 11 and the engine-hood garnish 7, which are attached to an inverse-pentagonal shaped recess portion which is formed at the central portion, in the vehicle width direction, of the bumper face 5 and opens at its upper side.

Herein, the front grille 11 is configured to extend along an edge of the recess portion of the bumper face 5 and open at its upper side as shown in FIGS. 1 and 5. This front grille 11 has laterally-extending fins which are disposed in the vehicle vertical direction at specified intervals and an emblem 11a which is provided at a central and upper side to indicate a company's name or the like.

The upper grille opening portion 10 includes an opening having a size which is large enough to integrally enclose a pair of right-and-left horns 41 and the shutter unit 50, in the front view, which are arranged inside the vehicle front portion 2 as shown in FIG. 1. Herein, the pair of right-and-left horns 41 and the shutter unit 50 will be described specifically later.

Inside the vehicle front portion 2 having the above-described appearance are provided, as shown in FIGS. 2 through 5, a pair of right-and-left front side frames 21 which extend in the vehicle longitudinal direction, a pair of right-and-left crash cans 23 which are connected to front ends of the front side frames 21 via flanges 22 and extend forward from the flanges 21, and a bumper reinforcement 24 which interconnects respective front ends of the crash cans 23 in the vehicle width direction.

Further, a pair of right-and-left apron reinforcements (not illustrated) which extend in the vehicle longitudinal direction on an outward and upper side relative to the front side frames 21, a shroud upper panel 25 which interconnects respective front ends of the apron reinforcement in the vehicle width direction, and a stay member 26 which connects the shroud upper panel 25 and the bumper reinforcement 24 at a central portion, in the vehicle width direction, of the vehicle are provided inside the vehicle front portion 2.

Additionally, inside the vehicle front portion 2 are provided a cooling panel 27 (see FIG. 5) which closes a gap between the engine-hood garnish 7 and the shroud upper panel 25, a shroud member 28 which is supported at the bumper reinforcement 24 and the shroud upper panel 25, and a leg sweeping member 29 which is supported at a lower portion of the shroud member 28.

A pair of right-and-left brackets 24a which support the shroud member 28 are previously joined to a rear face of the bumper reinforcement 24 as shown in FIG. 3. The shroud panel 25 is arranged substantially at the same position, in the vehicle longitudinal direction, as a rear end of the crash can 23 as shown in FIGS. 2 and 5.

The stay member 26 has a screw hole 26a for a fastening bolt 31 to fasten the air guide member 60, which will be described, at its lower portion as shown in FIG. 3. Further, the shroud member 28 is a synthetic-made frame member which is formed in a roughly rectangular shape in the front view, and arranged between the pair of right-and-left crash cans 23 as shown in FIGS. 2 through 4.

The shroud member 28 comprises a shroud upper portion 281 which extends in the vehicle width direction and is supported at the shroud upper panel 25, a pair of right-and-left shroud side portions 282 which extend downward from both side ends of the shroud upper portion 281, two shroud middle post portions 283 which are provided between the shroud side portions 282 to be spaced apart from each other in the vehicle width direction, and extend downward from the shroud upper portion 281, and shroud lower portions (not illustrated) which interconnect respective lower ends of the shroud side portions 282 and the shroud middle post portions 283, which are formed integrally.

The shroud member 28 forms a space between the shroud side portion 282 and the shroud middle post portion 283 as an air guide passage 28a which opens in the vehicle longitudinal direction at a position between the shroud upper portion 281 and the shroud lower portion. This air guide passage 28a serves as a flow passage through which the outside air flowing in through the upper grille opening portion 10 flows down rearward.

The shroud side portion 282 is, as shown in FIG. 3, provided with a screw hole (not illustrated) to screw a fastening bolt for fastening to the bracket 24a of the bumper reinforcement 24, a screw hole (not illustrated) to screw a fastening bolt 32 for fastening a side portion of the shutter unit 50, and a first support portion 284.

Herein, the first support portion 284, which is a roughly post-shaped member protruding forward, includes a clip attaching hole 284a to receive a plastic clip 33 for fixing the air guide member 60. The shroud middle post portion 283 includes a screw hole (not illustrated) to receive a fastening bolt 34 for fastening an upper portion of the shutter unit 50 at a position located upward from the screw hole for the fastening bolt 32 as shown in FIGS. 3 and 4.

The leg sweeping member 29, which is made from synthetic resin and formed in a roughly flat-plate shape, is formed in a curve shape such that its front end portion protrudes forward as shown in FIG. 2. This leg sweeping member 29 has a function of sweeping a leg of a pedestrian so as to put the pedestrian onto the engine hood, thereby decreasing a collision load applied to the pedestrian, when the vehicle front portion 2 contacts the pedestrian, for example.

As shown in FIGS. 3 through 5, inside the vehicle front portion 2 are provided the pair of right-and-left head light units 8, the pair of right-and-left horns 41 which are attached to a front face of the shroud upper panel 25, a front radar 42 which is attached to the stay member 26, a radiator 43 which is attached to a rear side of the shroud member 28, the intercooler 44 which is arranged below the bumper reinforcement 24, the shutter unit 50 which is arranged above the bumper reinforcement 24, and the air guide member 60.

The headlight unit 8 is configured as shown in FIG. 4 such that a lamp housing 8a which is positioned inside the vehicle front portion 2 is supported at the shroud upper panel 25. This lamp housing 8a is configured to protrude inward and overlap with the shroud side portion 282 in front of the shroud side portion 282 in the front view.

Herein, the headlight unit 8 is a lamp unit provided with plural LED lamps, for example, and a circuit board to control lighting of the LED lamps or the like and others are stored in the lamp housing 8a.

The pair of right-and-left horns 41 are, as shown in FIGS. 4 and 5, fixedly attached, via the respective horn brackets, to respective horn support portions 25a, each of which is provided at a front face of the shroud upper panel 25 at an outward side position between the shroud side portion 282 and the shroud middle post portion 283. The horn 41 is a scroll type of resonance tube and configured such that a horn opening portion 41a as an opening of the resonance tube is directed downward.

The front radar 42 is attached to the stay member 26 so as to face the emblem 11a of the grille opening portion 10 in the vehicle longitudinal direction. This front radar 42 is a millimeter-wave radar, for example, and has a function of measuring a distance from another vehicle traveling in front or an obstacle positioned in front.

The radiator 43 is fixedly attached to the shroud upper portion 281 and the shroud lower portion of the shroud member 28 as shown in FIG. 4. This radiator 43 is coupled to the engine via a radiator hose (not illustrated) and has a function of cooling the cooling water circulating inside the engine through the radiator 43 by using the outside air coming in from the vehicle front.

The intercooler 44 is fixedly attached to a front face of the shroud member 28 at a position located below the bumper reinforcement 24 as shown in FIGS. 3 and 5. This intercooler 44 is coupled to the engine and the supercharger (not illustrated) via an intercooler hose (not illustrated) and has a function of cooling compressed air flowing down from the supercharger toward the engine by using the outside air coming in from the vehicle front.

As shown in FIGS. 3 through 5, the shutter unit 50 has its vertical length which is substantially half of a vertical distance between the shroud upper panel 25 and the bumper reinforcement 24, and is of a roughly rectangular shape having a longer side in the vehicle width direction. This shutter unit 50 is disposed at a lower side position between the shroud upper panel 25 and the bumper reinforcement 24, being spaced apart from a lower end of the horn 41. Further, the shutter unit 50 is provided to be spaced rearward apart from the upper grille opening portion 10 and such that its front end is positioned in back of a front end of the bumper reinforcement 24.

Herein, the shutter unit 50 comprises the openable plural flaps 51, and a function of controlling a supply of the outside air to the radiator 43 by opening or closing the flaps 51. Specifically, as shown in FIGS. 4 through 6, the shutter unit 50 comprises the plural flaps 51 extending in the vehicle width direction, rotational support portions 52 which rotatably support both ends, in the vehicle width direction, of the flaps 51, a shutter frame member 53 which integrally encloses the plural flaps 51 and the rotational support portions 52, and an actuator 54 which rotationally drives the flaps 51.

Herein, the plural flaps 51 and the rotational support portions 52 are disposed in an inner space of the shutter frame member 53 such that the rotational support portion 52, three of the flaps 51, the rotational support portion 52, the other three flaps 51, and the other rotational support portion 52 are arranged in order from the vehicle right side. As shown in FIGS. 5 and 6, the flaps 51 are configured such that two sets of the three flaps 51 are positioned side by side on the right side and the left side, and each set includes the three flaps 51 which are spaced apart from each other in the vehicle vertical direction. Each of the right-side three flaps 51 and each of the three left-side flaps 51 are arranged coaxially on an imaginary rotational axis extending in the vehicle width direction.

Specifically, the flap 51 comprises a flap axial portion 511 which extends in the vehicle width direction, a roughly flat-plate shaped flap rear portion 512 which extends rearward from the flap axial portion 511, and a roughly flat-plate shaped flap front portion 513 which extends forward from the flap axial portion 511 in a state in which the outside air flows down rearward from the upper grille opening portion 10 through the shutter frame member 53, i.e., the flap 51 is open. Herein, the flap 51 is configured to have a sectional shape along the vehicle longitudinal direction, in which an upper face of the flap rear portion 512 and an upper face of the flap front portion 513 are made continuous from each other by a protrusion portion 514 which gently protrude upward. The flap front portion 513 is configured slightly above the flap rear portion 512. A length, in the vehicle longitudinal direction, of the flap front portion 513 is configured to be shorter than that of the flap rear portion 512.

The rotational support portion 52 comprises a right-side rotational support portion 52a, a central rotational support portion 52b, and a left-side rotational support portion 52c. The right-side rotational support portion 52a, the central rotational support portion 52b, the left-side rotational support portion 52c rotatably support the flap axial portions 511 of the flaps 51 substantially at the same position, in the vehicle longitudinal direction, as a rear end of the horn opening portion 41a, so that the right and left flaps 51 can be rotated integrally. Specifically, the rotational support portion 52 comprises a pivotal axis portion and others which pivotally support the flap axial portion 511 of the flap 51, a roughly rectangular housing having a longer side extending in the vehicle vertical direction which stores these therein, and so on. The rotational support portions 52 are configured such that the right-side rotational support portion 52a rotatably supports a right end of the right-side flap 51, the central rotational support portion 52b rotatably supports a left end of the right-side flap 51 and a right end of the left-side flap 51, and the left-side rotational support portion 52c rotatably supports a left end of the left-side flap 51.

As shown in FIGS. 5 and 6, the rectangular-shaped shutter frame member 53 is a synthetic-resin made tubal member, and comprises a top plate portion 531 which is positioned upward, a bottom plate portion 532 which is spaced downward apart from the top plate portion 531, a right-side face portion 533 which interconnects respective right ends of the top plate portion 531 and the bottom plate portion 532, and a left-side face portion 534 which interconnects respective left ends of the top plate portion 531 and the bottom plate portion 532. Further, the shutter frame member 53 comprises two side attachment portions 535 which are fixed to the shroud side portion 282 of the shroud member 28, two upper attachment portions 536 which are fixed to the shroud central post portion 283 of the shroud member 28, and two second support portions 537 which support a lower portion of the air guide member 60.

Herein, the shutter frame member 53 comprises the side attachment portions 535 and the upper attachment portions 536 such that the bottom plate 532 is positioned above the upper face of the bumper reinforcement 24 in a state in which the shutter frame member 53 is attached to the shroud member 28. The top plate portion 531 is configured in an eaves shape such that its front end is positioned in front of a front end of the flap 51 in a state in which the flaps 51 are open. Specifically, as shown in FIG. 5, the top plate portion 531 comprises a top-plate rear portion 531a which is positioned in back of the flap axial portion 511 of the flap 51 and a top-plate front portion 531b which is positioned in front of the flap axial portion 511. The top-plate rear portion 531a, which is of a roughly rectangular flat-plate shape having a longer side in the vehicle width direction, is configured such that its lower face slants rearward and upward. The top-plate front portion 531b is configured to be thicker than a front end of the top-plate rear portion 531a and extend forward from a front end of the top-plate rear portion 531a. Accordingly, the top-plate front portion 531b has a roughly perpendicular rear face which protrudes downward relative to the top-plate rear portion 531a at its rear end. Further, a front end of the top-plate front portion 531b is, as shown in FIGS. 3 and 6, configured such that a portion thereof which is other than a central portion, in the vehicle width direction, thereof which faces the stay member 26 when being attached to the vehicle front portion 2 is curved forward in a roughly arc shape in the plan view. As shown in FIG. 5, the top-plate front portion 531b has a sectional shape in the vehicle longitudinal direction at a central position, in the vehicle width direction, of the horn 41 such that a front end is positioned in back of a front end of the horn opening portion 41a. Additionally, as shown in FIG. 6, four top-plate air-guide grooves 531c which are recessed upward and extend in the vehicle longitudinal direction are formed at a lower face of the top-plate front portion 531b. The four top-plate air-guide grooves 531c are arranged at specified intervals in the vehicle width direction.

The bottom plate portion 532 has substantially the same shape as the top plate portion 531. Specifically, the bottom plate portion 532 comprises, as shown in FIG. 5, a bottom-plate rear portion 532a which is positioned in back of the flap axial portion 511 of the flap 51 and a bottom-plate front portion 532b which is positioned in front of the flap axial portion 511. The bottom-plate rear portion 532a has substantially the same size as the top-plate rear portion 531a, and is of a roughly rectangular flat-plate shape having a longer side in the vehicle width direction and configured such that its upper face slants rearward and downward. The bottom-plate front portion 532b is configured to be thicker than a front end of the bottom-plate rear portion 532a and extend obliquely forward and downward from a central portion, in the vehicle vertical direction, of the bottom-plate rear portion 532a. Accordingly, the bottom-plate rear portion 532a has a roughly perpendicular front face which protrudes upward relative to the bottom-plate front portion 532b at its front end. Further, a front end of the bottom-plate front portion 532b is, as shown in FIGS. 3 and 6, configured such that a portion thereof which is other than a central portion, in the vehicle width direction, thereof which faces the stay member 26 when being attached to the vehicle front portion 2 is curved forward in a roughly arc shape in the plan view. Additionally, as shown in FIGS. 3 and 6, six bottom-plate air-guide grooves 532c which are recessed downward and extend in the vehicle longitudinal direction are formed at the bottom-plate front portion 532b. The six bottom-plate air-guide grooves 532c are arranged at specified intervals in the vehicle width direction.

The right-side face portion 533 and the left-side face portion 534 are respectively configured in a roughly rectangular flat-plate shape, in the side view, to have a specified thickness in the vehicle width direction. The side attachment portions 535 are configured in a roughly rectangular flat-plate shape, in the front view, to extend outward, in the vehicle width direction, respectively from both rear ends of the right-side face portion 533 and the left-side face portion 534 as shown in FIGS. 3 and 6. This side attachment portion 535 has a bolt through hole (not illustrated) into which the fastening bolt 32 to be screwed into the screw hole of the shroud side portion 282 is inserted.

The upper attachment portion 536 is configured to rise upward from an upper face of the top-plate rear portion 531a as shown in FIGS. 3 and 4. This upper attachment portion 536 has a bolt through hole (not illustrated) into which the fastening bolt 34 to be screwed into the screw hole of the shroud middle post portion 283 is inserted.

As shown in FIGS. 3 and 6, the second support portions 537 are provided near a right-lower corner portion and a left-lower corner portion of the shutter frame member 53. Specifically, the second support portion 537 comprises a roughly-rectangular-shaped flat plate portion 537a which extends outward from a front lower end of the right or left side face portion 533, 534, an upper face portion 537b which interconnects an upper end of the flat plate portion 537a and a lower end of the side attachment portion 535, and a side face portion 537c which interconnects an outward edge of the flat plate portion 537a and a lower end of the side attachment portion 535. Further, the flat plate portion 537a has a clip attachment hole 537d to attach the plastic clip 35 for fixation of the air guide member 60. The right-side second support portion 537 forms a boxy shape which opens downward and extends in the vehicle longitudinal direction together with the right-side face portion 533. Meanwhile, the left-side second support portion 537 forms a boxy shape which opens downward and extends in the vehicle longitudinal direction together with the left-side face portion 534.

The actuator 54 stores a drive motor, some gears and others in its housing. This actuator 54 is attached to the right-side face portion 533 of the shutter frame member 53 and connected to the right-side rotational support portion 52a, thereby rotating the plural flaps 51.

The above-described shutter unit 50 changes its state by making the actuator 54 rotate the flaps 51, from a state in which the flaps 51 shown in FIG. 5 are open to another state in which the flaps 51 are closed to block the outside air's flowing down rearward are closed (see FIG. 7). Herein, the flaps 51 rotate around the flap axial portion 511 such that the flap rear portions 512 move obliquely upward and forward. In the state in which the flaps 51 are closed, as shown in FIG. 7, the flap rear portion 512 of the uppermost flap 51 comes to contact a rear face of the top-plate front portion 531b in a rotational direction, and the flap front portion 513 comes to contact the flap rear portion 512 of the middle-positioned flap 51 in the rotational direction. Meanwhile, as shown in FIG. 7, the flap rear portion 512 of the lowermost flap 51 comes to contact the flap front portion 513 of the middle-positioned flap 51 in the rotational direction and the flap front portion 513 of the lowermost flap 51 comes to contact a front face of the bottom-plate rear portion 532a in the rotational direction. Thus, the shutter unit 50 changes its state between the state in which the outside air flows down inside the shutter frame member 53 and the state in which the outside air does not flow down inside the shutter frame member 53.

The air guide member 60 is arranged so as to close a gap between a lower portion of the upper grille opening portion 10 and the flaps 51 as shown in FIGS. 2, 3 and 5. This air guide member 60 is, as shown in FIG. 4, of a synthetic-resin made member having a roughly U shape, in the front view, and opening upward, and has a size so as to enclose the shutter frame member 53 and the actuator 54. Specifically, as shown in FIGS. 3 through 5, the air guide member 60 comprises a lower face portion 61 which is arranged between the lower portion of the upper grille opening portion 10 and the flaps 51 and a pair of right-and-left side wall portions 62 which extend upward from both ends, in the vehicle width direction, of the lower face portion 61.

The air guide member 60 further comprises two first fixation portions 63 which are fixed to the first support portions 284 of the shroud member 28, two second fixation portions 64 which are fixed to the second support portions 537 of the shutter unit 50, and a single third fixation portion 65 which is fixed to the stay member 26. Additionally, the air guide member 60 has, at the side wall portions 62, air guide openings 60a where the outside air flowing in through the upper grille opening portion 10 flows down toward the headlight unit 8.

The lower face portion 61 is configured to have a length in the vehicle width direction which is substantially the same as that of the shutter unit 50 in a state in which it is attached to the shutter unit 50 as shown in FIGS. 3 and 5 and 8. Further, a longitudinal length of the lower face portion 61 in the state of being attached to the shutter unit 50 is configured such that a front end of the lower face portion 61 is positioned substantially the same position as the front end of the bumper reinforcement 24 and also its rear end is positioned in back of the front end of the bottom plate portion 532 of the shutter unit 50. Specifically, as shown in FIGS. 3, 5 and 8, the lower face portion 61 comprises an upper-stage face portion 611 which faces the bottom plate portion 532 of the shutter unit 50 with a specified upward distance, a lower-stage face portion 612 which faces an upper face of the bumper reinforcement 24 with a specified upward distance, and a front wall portion 613 which vertically interconnects a front end of the upper-stage face portion 611 and a rear end of the lower-stage face portion 612. The upper-stage face portion 611 is configured to step down at both ends, in the vehicle width direction, thereof in the front view. This upper-stage face portion 611 has a cross section in the vehicle longitudinal direction, a rear end of which is positioned in back of the front end of the bottom plate portion 532 of the shutter unit 50, and which gently slants from the rear end. In other words, the upper-stage face portion 611 is configured such that the vicinity of its rear end overlaps with the vicinity of the front end of the bottom plate portion 532 of the shutter unit 50, being spaced vertically apart from the vicinity of the front end of the bottom plate portion 532, in a state in which the upper-stage face portion 611 is attached to the shutter unit 50. The lower-stage face portion 612 is configured such that its both ends gently slant upward toward both ends, in the vehicle width direction, of the upper-stage face portion 611 in the front view. This lower-stage face portion 612 has a cross section in the vehicle longitudinal direction which slightly slants forward and downward from a rear end. Further, the lower-stage face portion 612 has two air guide grooves 612a which are recessed downward and extend in the vehicle longitudinal direction. These two air guide grooves 612a are spaced apart from each other in the vehicle width direction.

The side wall portion 62 comprises, as shown in FIGS. 3 and 8, a side wall body portion 621 which is of a flat shape having a specified thickness in the vehicle width direction, an outward edge portion 622 which is formed along a front end of the side wall body portion 621, and an inward edge portion 623 which is formed along a rear end and a lower end of the side wall body portion 621. The side wall body portion 621 is configured as shown in FIG. 4 such that its upper end is positioned above the shutter unit 50 and below the lap housing 8a of the lamp unit 8.

Thus, the air guide member 60 has the air guide openings 60a as the space through which the outside air flows down toward the headlight unit 8 at the vehicle upper side between the shroud upper panel 25 and the shutter unit 50 in the state in which the air guide member 60 is attached to the vehicle front portion 2. The outward edge portion 622 is configured such that a front end of the side wall body portion 621 bends outward at a roughly right angle and its lower end connects to the vicinity of the front end of the lower face portion 61. The inward edge portion 623 is configured such that a rear end and a lower end of the side wall body portion 621 bends inward at a roughly right angle and its lower end connects to an edge end, in the vehicle width direction, of the lower face portion 61.

The first fixation portion 63 is provided at an upper end of the side wall portion 62. Specifically, the first fixation portion 63 is configured in a roughly-rectangular flat shape in the front view such that it extends forward from an upper end of the inward edge portion 623 along an upper end of the side wall body portion 621 and then rises upward. This first fixation portion 63 has a clip through hole 63a through which the plastic clip 33 is inserted. The second fixation portion 64 is configured in a roughly flat plate shape to rise upward from an end, in the vehicle width direction, of the lower face portion 61. Specifically, the second fixation portion 64 extends upward so as to connect a rear end of a lowering portion of the upper-stage face portion 611 and the inward edge portion 623 of the side wall portion 62. This second fixation portion 64 has a clip through hole 64a for insertion of the plastic clip 35. This clip insertion hole 64a is positioned such that the plastic clip 35 is attached to the second support portion 537 of the shutter unit 50 in a state in which the lower face portion 61 is spaced upward apart from the bottom plate portion 532 of the shutter unit 50. The third fixation portion 65 is provided at a central portion, in the vehicle width direction, of the lower face portion 61 such that it faces upward. Specifically, the third fixation portion 65 is configured in a roughly U shape in the plan view such that a central portion, in the vehicle width direction, of the front wall portion 613 extends upward and connects to the upper-stage face portion 611. This third fixation portion 65 has a bolt through hole 65a for insertion of the fastening bolt 31 to be screwed into the screw hole 26a formed at the lower portion of the stay member 26.

As shown in FIGS. 3 and 8, resilient sponges 66 having a roughly square-pillar shape are pasted to respective front faces of upper and lower portions of the outward edge portions 622, respective rear and lower faces of the inward edge portions 623, a rear face of the front wall portion 613, and a lower face of the lower-stage face portion 612 of the above-described air guide member 60. The sponges 66 pasted to the front faces of the upper and lower portions of the outward edge portion 622 are configured to contact the rear face of the bumper face 5 in a state in which the air guide member 60 is attached to the vehicle front portion 2. The sponges 66 pasted to the rear faces of the inward edge portion 623 are configured to contact the side attachment portions 535 of the shutter unit 50 in the state in which the air guide member 60 is attached to the vehicle front portion 2. The sponges 66 pasted to the lower faces of the inward edge portion 623, the rear face of the front wall portion 613, and the lower face of the lower-stage face portion 612 are configured to contact the bumper reinforcement 24.

Next, a flow of outside air W which flows in through the upper grille opening portion 10 in the above-described vehicle front portion 2 will be described specifically referring to FIGS. 9 and 10. Herein, FIG. 9 is an explanatory diagram explaining the flow of the outside air W in the state in which the flaps 51 are open and FIG. 10 is an explanatory diagram explaining the flow of the outside air W in the state in which the flaps 51 are closed.

Figure 9:
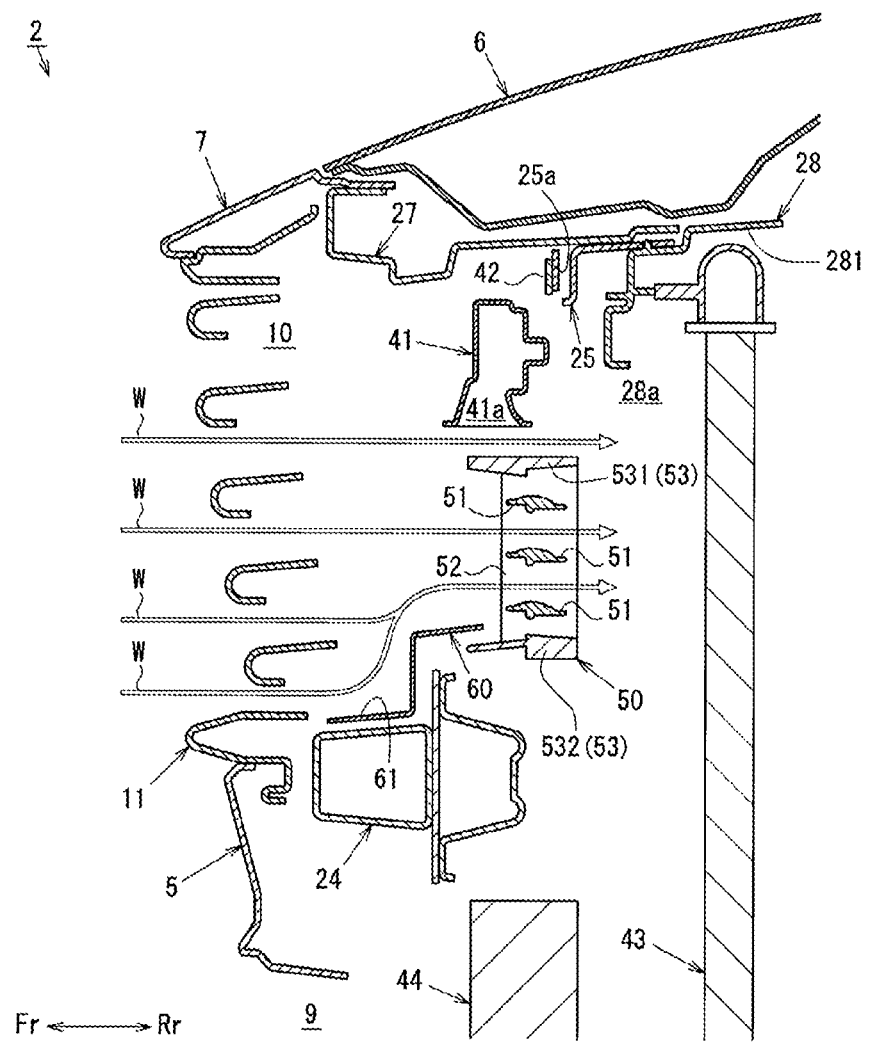
FIG. 9 is an explanatory diagram explaining a flow of outside air in the state in which the flaps are open.
Figure 10:
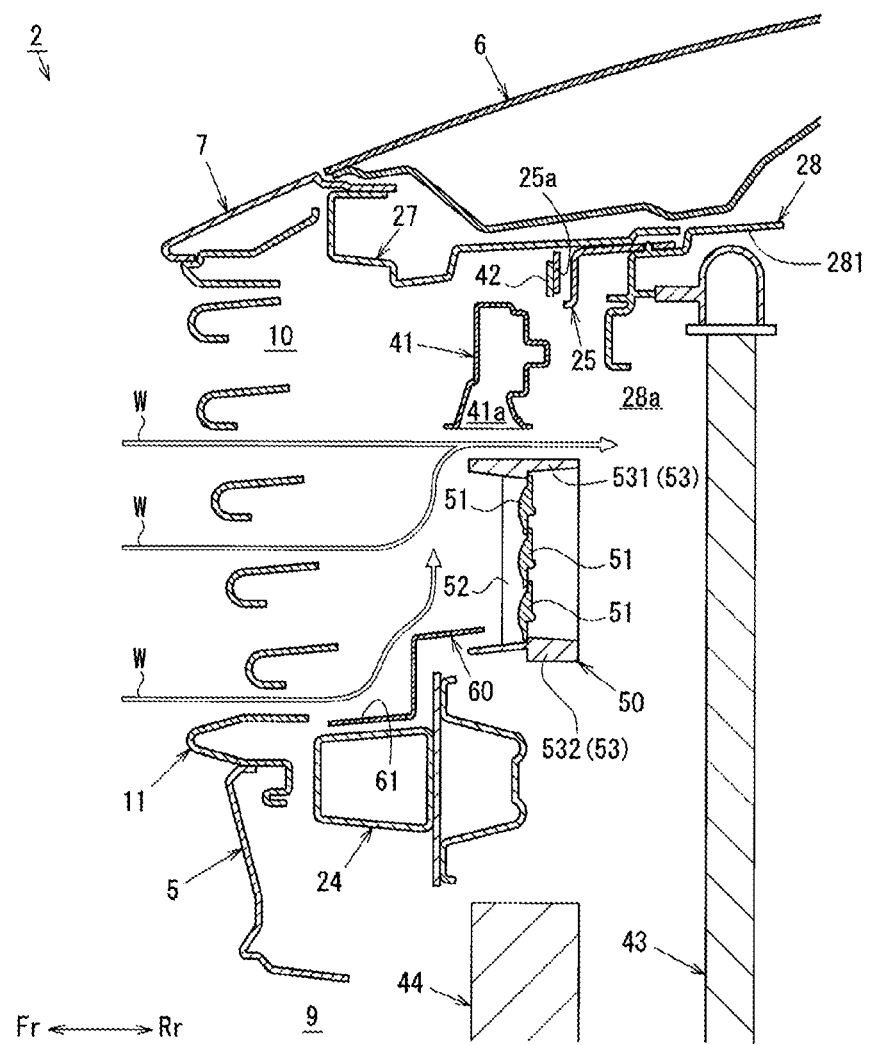
FIG. 10 is an explanatory diagram explaining the flow of the outside air in the state in which the flaps are closed.

First, in the case in which the flaps 51 are open, the outside air W flowing in through the upper grille opening portion 10 passes around the horn 41 and between the flaps 51 of the shutter unit 50, and flows rearward from the air guide passage 28a of the shroud member 28 as shown in FIG. 9. Meanwhile, in the case in which the flaps 51 are closed, the rearward flow of the outside air W flowing in through the upper grille opening portion 10 is blocked by the flaps 51 as shown in FIG. 10. Accordingly, the outside air W flowing in from the lower portion of the upper grille opening portion 10 deflects upward due to the shutter unit 50. Then, the outside air W deflecting upward flows upward through an upper-side opening of the air guide member 60 and the air guide opening 60a, and joins the outside W flowing down rearward from the upper portion of the grille opening portion 10 and flows down rearward. Herein, the outside air W flowing through the air guide opening 60a flows toward the lamp housing 8a of the headlight unit 8, and then joins the outside air W flowing down rearward from the upper portion of the upper grille opening portion 10 and flows down rearward. Then, the outside air W passes around the horn 41 and through the air guide passage 28a of the shroud member 28, and flows through an upper portion of the radiator 43, and then flows down rearward along a lower face of the engine hood 6. That is, in the case in which the flaps 51 are closed, the outside air W flowing in through the upper grille opening portion 10 passes an upper portion inside the vehicle front portion 2 and flows down rearward.

Figure 11:
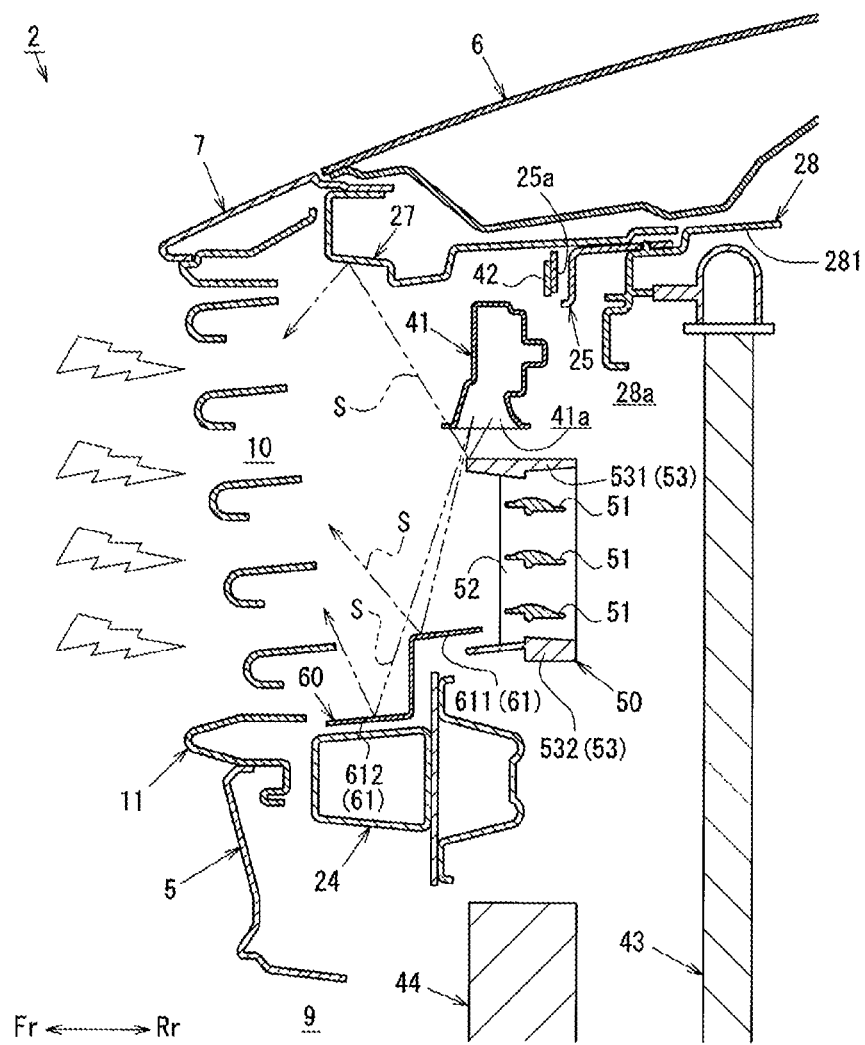
FIG. 11 is an explanatory diagram explaining a propagation direction of a horn sound.

Subsequently, the manner of propagation of a horn sound S emitted from the horn opening portion 41a at the time the horn 41 is operated by a passenger will be described specifically referring to FIG. 11. FIG. 11 is an explanatory diagram explaining propagation directions of the horn sound S.

When being operated by the passenger, the horn 41 emits the horn sound S downward from the horn opening portion 41a opening downward as shown by two-dotted broken lines in FIG. 11. Herein, the horn sound S propagated downward and forward is reflected forward and upward by the top plate portion 531 of the shutter unit 50. Further, the horn sound S reflected forward and upward is reflected downward and forward by the cooling panel 27 and then propagated toward the upper grille opening portion 10. Meanwhile, the horn sound S passing through a side located in front of the front end of the top plate portion 531 is reflected upward and forward by the upper-stage face portion 611 and the lower-stage face 612 of the air guide member 60, and then propagated toward the upper grille opening portion 10 as shown by the two-dotted broken lines in FIG. 11. Thus, the horn sound S is propagated forward through the upper grille opening portion 10, being reflected in various directions inside the vehicle front portion 2.

The front air-rectifying structure of the automotive vehicle 1 which performs the above-described flow of the outside air W and the above-described propagation manner of the horn sound S can properly suppress the vibration transmission to the shutter unit 50, without damaging the air-guide performance for the shutter unit 50, thereby preventing any problem from happening to the move of the flaps 51. Specifically, the rigidity of the vicinity of the corner portion of the shutter frame member 53 becomes higher, compared with the bottom plate portion 532 or the central portion, in the vehicle vertical direction, of the right-side face portion 533 or the left-side face portion 534. Accordingly, the front air-rectifying structure of the automotive vehicle 1 can be configured to improve the support rigidity of the second support portion 537, compared with a case in which the second support portion is provided at the right-side face portion 533 or the left-side face portion 534 of the shutter frame member 53, for example. Thereby, in a case in which the lower face portion 61 is made to vibrate by the pressure fluctuation of the outside air W flowing in through the upper grille opening portion 10, for example, the second support portion 537 of the shutter frame member 53 can damp the vibration inputted via the second fixation portion 64 of the air guide member 60 and transmit it to the shutter frame member 53. Further, the second support portion 537 can be a positioning means for determining the position of the lower face portion 61 relative to the shutter frame member 53. Specifically, in a case in which the second support portion is provided at the shroud member 28, for example, there is a problem that a relative position of the lower face portion 61 to the shutter frame member 53 is not stable because of a position shift of the shutter unit 50 relative to the shroud member 28 and a position shift of the air guide member 60 relative to the shroud member 28.

Meanwhile, the front air-rectifying structure of the automotive vehicle 1 can suppress the position shift of the lower face portion 61 relative to the shutter frame member 53 because the second support portion 537 is provided at the shutter unit 50 more properly, compared with the case in which the second support portion is provided at the shroud member 28. Accordingly, the front air-rectifying structure of the automotive vehicle 1 can stably ensure the distance between the shutter frame member 53 and the lower face portion 61 when the second fixation portion 64 of the air guide member 60 is fixed to the second support member 537 of the shutter unit 50. That is, the second support portion 537 can be made to serve as the positioning means for determining the position of the lower face portion 61 relative to the shutter frame member 53.

Thus, the front air-rectifying structure of the automotive vehicle 1 can make the lower face portion 61 contact the shutter frame member 53 when the lower face portion 61 vibrates due to the pressure fluctuation of the outside air W flowing in through the upper grille opening portion 10, for example, thereby suppressing the transmission of the vibration of the lower face portion 61 to the shutter unit 50. Therefore, the front air-rectifying structure of the automotive vehicle 1 in which the air guide member 60 is fixed to the second support portion 537 of the shutter unit 50 having the high support rigidity can properly suppress the vibration transmission to the shutter unit 50, without damaging the air-guide performance for the shutter unit 50, thereby preventing any problem from happening to the move of the flaps 51.

Further, according to the front air-rectifying structure of the automotive vehicle 1 in which the second support portion 537 of the shutter unit 50 is configured to have the roughly boxy shape extending in the vehicle longitudinal direction, since the support rigidity of the second support portion 537 is improved, the vibration transmitted to the shutter frame member 53 via the second fixation portion 64 of the air guide member 60 can be further suppressed. Therefore, the vibration transmission to the shutter unit 50 can be surely suppressed by the second support portion 537 formed in the roughly boxy shape.

Moreover, the front air-rectifying structure of the automotive vehicle 1, in which the air guide member 60 comprises the lower face portion 61 which has the second fixation portion 64 at the position in the vicinity of each of the both ends, in the vehicle width direction, thereof and a pair of right-and-left side wall portions 62 which have the first fixation portion 63, and the third fixation portion 65 fixed to the stay member 26 is provided at the portion of the lower face portion 61 which is positioned between the both second fixation portions 64, can surely prevent any problem from happening to the move of the flaps 51 and surely suppress the vibration transmission to the shutter unit 50. Specifically, the air guide member 60 can be supported by the second support portion 537 of the shutter unit 50, the first support portion 284 of the shroud member 28, and the stay member 26 by fixing the air guide member 60 to the stay member 26. Accordingly, the air guide member 60 can be supported at plural points by the shroud member 28 and the stay member 26 which have a higher rigidity than the shutter unit 50. Therefore, the weight of the air guide member 60 added to the second support portion 537 of the shutter unit 50 can be reduced.

Further, in a case in which the lower face portion 61 is made to vibrate by the pressure fluctuation of the outside air W flowing in through the upper grille opening portion 10, for example, the stay member 26 can transmit the vibration inputted by way of the third fixation portion 65 to the shroud upper panel 25. Thereby, the vibration of the lower face portion 61 can be transmitted to the shroud member 28 by way of the first fixation portion 63 and transmitted to the shroud upper panel 25 by way of the third fixation portion 65. Thereby, deformation of the shutter frame member 53 can be suppressed by the weight of the air guide member 60 added to the second support portion 537. Further, the vibration transmitted to the shutter unit 50 by way of the second fixation portion 64 of the air guide member 60 can be surely suppressed. Accordingly, the front air-rectifying structure of the automotive vehicle 1 can surely prevent any problem from happening to the move of the flaps 51 and surely suppress the vibration transmission to the shutter unit 50 by providing the third fixation portion 65 fixed to the stay member 26 at the lower face portion 61 of the air guide member 60.

Also, the front air-rectifying structure of the automotive vehicle 1, in which the lower face portion 61 of the air guide member 60 in the state in which the second fixation portion 64 is fixed to the second support portion 537 is spaced apart upward from the bottom plate portion 532 of the shutter frame member 53, and the length, in the vehicle longitudinal direction, of the lower face portion 61 is configured such that its front end is positioned in the vicinity of the front end of the bumper reinforcement 24 and its rear end is positioned in back of the front end of the bottom plate portion 532 of the shutter frame member 53, can stably ensure the air-guide performance for the shutter unit 50 and also compatibly suppress the vibration transmission to the shutter unit 50 and any breakage of the shutter unit 50. Specifically, since the length, in the vehicle longitudinal direction, of the lower face portion 61 is configured such that the front end is positioned in the vicinity of the front end of the bumper reinforcement 24 and the rear end is positioned in back of the front end of the bottom plate portion 532 of the shutter frame member 53, the lower face portion 61 can overlap upward with the bottom plate portion 532 of the shutter frame member 53. Thus, compared with a case in which the lower face portion overlaps downward with the bottom plate portion 532 of the shutter frame member 53, the air guide member 60 can surely guide the outside air W flowing in through the upper grille opening portion 10 to the flaps 51. Accordingly, the front air-rectifying structure of the automotive vehicle 1 can stably ensure the air-guide performance for the shutter unit 50. Further, in a case of the light collision in which a retreat amount of the bumper reinforcement 24 is small, since the front end of the bottom plate portion 532 of the shutter frame member 53 is positioned in back of the front end of the bumper reinforcement 24, it can be prevented that the shutter unit 50 is pressed rearward by an object colliding with the vehicle front portion 2.

In addition, since the retreat of the air guide member 60 by the pressing of the collision object can be suppressed by the stay member 26, the lower face portion 61 of the air guide member 60 having a low rigidity deforms or gets broken in a case in which the collision object presses the air guide member 60. Accordingly, the front air-rectifying structure of the automotive vehicle 1 can suppress the pressing of the shutter unit 50 even in a case in which the collision object presses the air guide member 60. Thus, in the case of the light collision, the retreat of the air guide member 60 can be suppressed and also the breakage of the shutter unit 50 can be suppressed. Accordingly, the front air-rectifying structure of the automotive vehicle 1 can stably ensure the air-guide performance to the shutter unit 50 and compatibly suppress the vibration transmission to the shutter unit 50 and the breakage of the shutter unit 50.

Further, since the air guide member 60 is made from the synthetic resin, the front air-rectifying structure of the automotive vehicle 1 can be provided with the air guide member 60 having a lower cost and higher rigidity, compared with a case in which the air guide member is made of a synthetic rubber or a thin metal plate. Thus, in a case in which the pressure fluctuation happens to the outside air W flowing in through the upper grille opening portion 10, for example, the air guide member 60 can prevent the vibration from occurring at the lower face portion 61, thereby suppressing the vibration transmission to the shutter unit 50. Accordingly, the front air-rectifying structure of the automotive vehicle 1 can surely suppress the vibration transmission to the shutter unit 50, without damaging the air-guide performance for the shutter unit 50.

In a correspondent relation between the present claimed invention and the above-described embodiment, the grille opening portion of the invention corresponds to the upper opening portion 10 of the embodiment. Likewise, the vehicle-body member corresponds to the shroud upper panel 25 or the shroud member 28, the shutter frame portion corresponds to the shutter frame member 53, the first support portion corresponds to the second support portion 537, the air guide portion corresponds to the lower face portion 61 or the side wall portion 62, the first fixation portion corresponds to the second fixation portion 64, the second support portion corresponds to the first support portion 284, the second fixation portion corresponds to the first fixation portion 63, the bottom plate portion of the shutter frame portion corresponds to the bottom plate portion 532 of the shutter frame member 53, the lower face portion of the air guide member corresponds to the lower face portion 61 of the air guide member 60, and a pair of right-and-left side face portion correspond to the side wall portions 62. Further, the drive mechanism portion corresponds to the actuator 54, the outer peripheral face of the shutter frame portion or the side portion of the shutter frame portion correspond to the right-side face portion 533 of the shutter frame member 53, the specified electric device corresponds to the front radar 42, the heat generating equipment corresponds to the headlight unit 8, and the connecting passage corresponds to the air guide opening 60a. Moreover, the horn opening portion corresponds to the horn opening portion 41a, the top palate portion of the shutter frame portion corresponds to the top plate portion 531 of the shutter frame member 53, and the echo portion corresponds to the lower face portion 61 of the air guide member 60.

The present invention should not be limited to the above-described embodiment, and any other modifications or improvements may be applied within the scope of a spirit of the present invention.

For example, while the shutter unit 50 and the first fixation portion 63 of the air guide member 60 are attached to the shroud member 28 in the above-described embodiment, any vehicle-body member having a high rigidity, such as any member which supports the shroud member 28, is applicable. Also, while the shutter unit 50 includes the plural flaps 51 arranged in the vehicle vertical direction in the embodiment, the flaps may be arranged in the vehicle width direction. Further, while the shutter unit 50 is provided above the bumper reinforcement 24 in the embodiment, in a case in which the automotive vehicle is not equipped with the intercooler 44, the shutter unit 50 may be provided below the bumper reinforcement 24.

While the air guide member 60 is made from the synthetic resin in the embodiment, the air guide member may be made by bending a metal-made thin plate. Further, the air guide member 60 of the embodiment is configured in the roughly U shape, in the front view, which opens upward, any air guide member which has a roughly U shape, in the front view, which opens downward or any tubal-body air guide member which has a roughly rectangular shape in the front view are applicable.

Also, while the embodiment is configured such that the lower face portion 61 of the air guide member 60 overlaps upward with the bottom plate portion 532 of the shutter frame member 53, the lower face portion 61 of the air guide member 60 overlaps downward with the bottom plate portion 532 of the shutter frame member 53. While the second support portion 537 is formed at the outer-face side near the corner portion of the shutter frame member 53, the second support portion may be formed at an inner-face side of the shutter frame member 53 as long as that is formed near the corner portion of the shutter frame member 53.

While the embodiment provides the single stay member 26 interconnecting the bumper reinforcement 24 and the shroud upper panel 25, two or more stay members 26 are provided. In this case, plural third fixation portions 26 may be provided so as to fix the air guide member 60 to all of the stay members 26. Alternatively, the third fixation potion may be provided so as to fix the air guide member 60 to part of the plural stay members 26.

What is claimed is:
1. A front air-rectifying structure of an automotive vehicle, comprising:

a grille opening portion formed at a bumper face which is provided at a vehicle front portion of the automotive vehicle;
a shutter unit attached to a vehicle-body member which is positioned in back of the bumper face; and
an air guide member provided to guide air flowing in through the grille opening portion toward to the shutter unit,
wherein said shutter unit comprises openable flaps, a shutter frame portion having a roughly rectangular shape in a front view and provided to enclose the flaps, and a first support portion to support said air guide member which is formed in the vicinity of a corner portion of the shutter frame portion,
said air guide member comprises an air guide portion positioned between said grille opening portion and said flaps of the shutter unit, a first fixation portion fixed to said first support portion of the shutter unit, and a second fixation portion fixed to a second support portion which is provided at said vehicle-body member, and
said air guide member is configured such that the air guide portion thereof in a state in which the first fixation portion of the air guide member is fixed to the first support portion of the shutter unit is spaced apart, upward or downward, from said shutter frame portion of the shutter unit.

2. The front air-rectifying structure of the automotive vehicle of claim 1, wherein said first support portion of the shutter unit is configured to have a roughly boxy shape extending in a vehicle longitudinal direction.

3. The front air-rectifying structure of the automotive vehicle of claim 2, wherein said shutter unit is positioned in front of said vehicle-body member and above a bumper reinforcement which extends in a vehicle width direction, a stay member which connects an upper portion of the vehicle-body member and said bumper reinforcement is provided, and said air guide portion of the air guide member comprises a lower face portion which is positioned between said grille opening portion and said flaps of the shutter unit and has said first fixation portion at a position in the vicinity of each of both ends, in the vehicle width direction, thereof, and a pair of right-and-left side face portions which are configured to stand upward from the both ends, in the vehicle width direction, of the lower face portion and have said second fixation portion at each of upper sides thereof, and a third fixation portion which is fixed to said stay member is provided at a portion of said lower face portion of the air guide portion of the air guide member which is positioned between both of said first fixation portions.

4. The front air-rectifying structure of the automotive vehicle of claim 1, wherein said shutter unit is positioned in front of said vehicle-body member and above a bumper reinforcement which extends in a vehicle width direction, a stay member which connects an upper portion of the vehicle-body member and said bumper reinforcement is provided, and said air guide portion of the air guide member comprises a lower face portion which is positioned between said grille opening portion and said flaps of the shutter unit and has said first fixation portion at a position in the vicinity of each of both ends, in the vehicle width direction, thereof, and a pair of right-and-left side face portions which are configured to stand upward from the both ends, in the vehicle width direction, of the lower face portion and have said second fixation portion at each of upper sides thereof, and a third fixation portion which is fixed to said stay member is provided at a portion of said lower face portion of the air guide portion of the air guide member which is positioned between both of said first fixation portions.

5. The front air-rectifying structure of the automotive vehicle of claim 4, wherein a bottom plate portion of said shutter frame portion of the shutter unit is configured such that a front end thereof is positioned in back of a front end of said bumper reinforcement, said lower face portion of the air guide portion of the air guide member in the state in which the first fixation portion of the air guide member is fixed to the first support portion of the shutter unit is spaced apart upward from said bottom plate portion of the shutter frame portion of the shutter unit, and a length, in the vehicle longitudinal direction, of the lower face portion of the air guide portion is configured such that a front end of the lower face portion is positioned in the vicinity of the front end of the bumper reinforcement and a rear end of the lower face portion is positioned in back of a front end of said bottom plate portion of the shutter frame portion of the shutter unit.

6. The front air-rectifying structure of the automotive vehicle of claim 4, wherein said air guide member is made from synthetic resin.

7. The front air-rectifying structure of the automotive vehicle of claim 4, wherein said shutter unit is arranged above a bumper reinforcement of the vehicle front portion, said grille opening portion is configured to face the shutter unit, a drive mechanism portion to drive said flaps for opening or closing is provided at an outer peripheral face of said shutter frame portion, and said air guide member is configured in a shape to integrally enclose the shutter frame portion and said drive mechanism portion.

8. The front air-rectifying structure of the automotive vehicle of claim 7, wherein said shutter unit is configured to face said grille opening portion in a longitudinal direction and have a facing area which is covered by an opening area of the grille opening portion.

9. The front air-rectifying structure of the automotive vehicle of claim 7, wherein said drive mechanism portion is provided at a side portion or a lower portion of said shutter frame portion, and said air guide member is configured to be arranged close to said bumper reinforcement in a vehicle vertical direction and have a roughly U shape, in a front view, which opens upward.

10. The front air-rectifying structure of the automotive vehicle of claim 7, wherein an electric device to detect a front side which is located in front of the bumper face is provided at a central position, in a vehicle width direction, of the vehicle, which is located in front of the shutter unit, said drive mechanism portion is arranged at a side portion of said shutter frame portion.

11. The front air-rectifying structure of the automotive vehicle of claim 7, wherein a heat generating equipment which is required to be cooled is provided above said shutter unit, and said air guide member is provided with a connecting passage which connects to the vicinity of said heat generating equipment, the connecting passage being positioned above said drive mechanism portion of the shutter unit.

12. The front air-rectifying structure of the automotive vehicle of claim 7, wherein said shutter unit is arranged above a bumper reinforcement of the vehicle front portion, a horn device is provided above the shutter unit, having a specified distance from the shutter unit, said grille opening portion is configured to face the shutter unit, said horn device is configured such that a horn opening portion which is an inlet and an outlet of a horn sound opens downward, and a top plate portion of said shutter frame portion is configured such that a front end thereof is positioned in back of a front end of said horn opening portion.

13. The front air-rectifying structure of the automotive vehicle of claim 12, wherein said grille opening portion, said shutter unit, and said horn device are configured such that the shutter unit and the horn device are positioned in an opening range of the grille opening portion in the front view.

14. The front air-rectifying structure of the automotive vehicle of claim 12, wherein an echo portion which faces the horn opening portion of said horn device is provided between a lower portion of said grille opening portion and said flaps, the echo portion being configured to slant forward and downward.

15. The front air-rectifying structure of the automotive vehicle of claim 4, wherein said shutter unit is arranged above a bumper reinforcement of the vehicle front portion, a horn device is provided above the shutter unit, having a specified distance from the shutter unit, said grille opening portion is configured to face the shutter unit, said horn device is configured such that a horn opening portion which is an inlet and an outlet of a horn sound opens downward, and a top plate portion of said shutter frame portion is configured such that a front end thereof is positioned in back of a front end of said horn opening portion.

16. The front air-rectifying structure of the automotive vehicle of claim 1, wherein said shutter unit is arranged above a bumper reinforcement of the vehicle front portion, a horn device is provided above the shutter unit, having a specified distance from the shutter unit, said grille opening portion is configured to face the shutter unit, said horn device is configured such that a horn opening portion which is an inlet and an outlet of a horn sound opens downward, and a top plate portion of said shutter frame portion is configured such that a front end thereof is positioned in back of a front end of said horn opening portion.

* * * * *